United States Patent
Kaulgud et al.

(10) Patent No.: US 10,452,521 B2
(45) Date of Patent: Oct. 22, 2019

(54) DEVELOPMENT AND PRODUCTION DATA BASED APPLICATION EVOLUTION

(71) Applicant: ACCENTURE GLOBAL SOLUTIONS LIMITED, Dublin (IE)

(72) Inventors: Vikrant Kaulgud, Pune (IN); Kapil Singi, Bangalore (IN); Amitabh Saxena, Bangalore (IN); Chethana Dinakar, Bangalore (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1 day.

(21) Appl. No.: 15/660,368

(22) Filed: Jul. 26, 2017

(65) Prior Publication Data

US 2018/0046570 A1  Feb. 15, 2018

(30) Foreign Application Priority Data

Aug. 11, 2016 (IN) .............................. 201641027482

(51) Int. Cl.
| | |
|---|---|
| G06F 11/36 | (2006.01) |
| G06F 8/70 | (2018.01) |
| G06Q 10/06 | (2012.01) |

(52) U.S. Cl.
CPC ............ *G06F 11/3676* (2013.01); *G06F 8/70* (2013.01); *G06F 11/3672* (2013.01); *G06Q 10/06* (2013.01)

(58) Field of Classification Search
CPC .. G06F 11/36; G06F 11/3664; G06F 11/3668; G06F 11/3672; G06F 11/3676; G06F 11/3684; G06F 8/20; G06F 8/70; G06F 17/3053; Y10S 707/99943; G06Q 10/06
USPC .............................. 717/122, 124; 714/38.1
See application file for complete search history.

(56) References Cited

U.S. PATENT DOCUMENTS

| | | |
|---|---|---|
| 9,396,092 B1 | 7/2016 | Kuo et al. |
| 2006/0129892 A1 | 6/2006 | Diaconu et al. |
| 2009/0165004 A1 | 6/2009 | Moses et al. |
| 2011/0251868 A1* | 10/2011 | Mikurak ............... G06Q 10/06 705/7.25 |
| 2011/0271286 A1 | 11/2011 | Kemmler et al. |
| 2012/0054761 A1 | 3/2012 | Bagheri et al. |
| 2013/0227582 A1 | 8/2013 | Daly et al. |
| 2014/0282400 A1 | 9/2014 | Smoothi et al. |

(Continued)

*Primary Examiner* — Anna C Deng
*Assistant Examiner* — Mohammed N Huda
(74) *Attorney, Agent, or Firm* — Mannava & Kang, P.C.

(57) ABSTRACT

According to examples, development and production data based application evolution may include ascertaining a goal, development data, and production data for a specified release of an application. Development and production data based application evolution may further include determining, from the development data, a feature, a use-case associated with the feature, and a plurality of tasks associated with the use-case. Further, development and production data based application evolution may include determining, from the production data, production log data and user feedback, determining, from the production log data and the user feedback data, criteria, ascertaining, a weightage for each criterion of the criteria, and determining, based on the weightage, a task priority for each task of the plurality of tasks to be applied to a different release of the application.

20 Claims, 30 Drawing Sheets

(56) References Cited

U.S. PATENT DOCUMENTS

| | | |
|---|---|---|
| 2015/0254597 A1 | 9/2015 | Jahagirdar et al. |
| 2016/0117239 A1 | 4/2016 | Hamilton et al. |
| 2016/0162392 A1* | 6/2016 | Hu et al. ............ G06F 11/3684 |
| | | 714/38.1 |

* cited by examiner

__US 10,452,521 B2__

DEVELOPMENT AND PRODUCTION DATA BASED APPLICATION EVOLUTION

PRIORITY

The present application claims priority under 35 U.S.C. 119(a)-(d) to Indian patent application number 201641027482, having a filing date of Aug. 11, 2016, the disclosure of which is hereby incorporated by reference in its entirety.

BACKGROUND INFORMATION

An application is a computer program designed to perform activities, tasks, or a group of specified functions. Examples of an application include a word processor, a spreadsheet, an accounting application, a web browser, etc. An application may include a design phase and a release phase.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
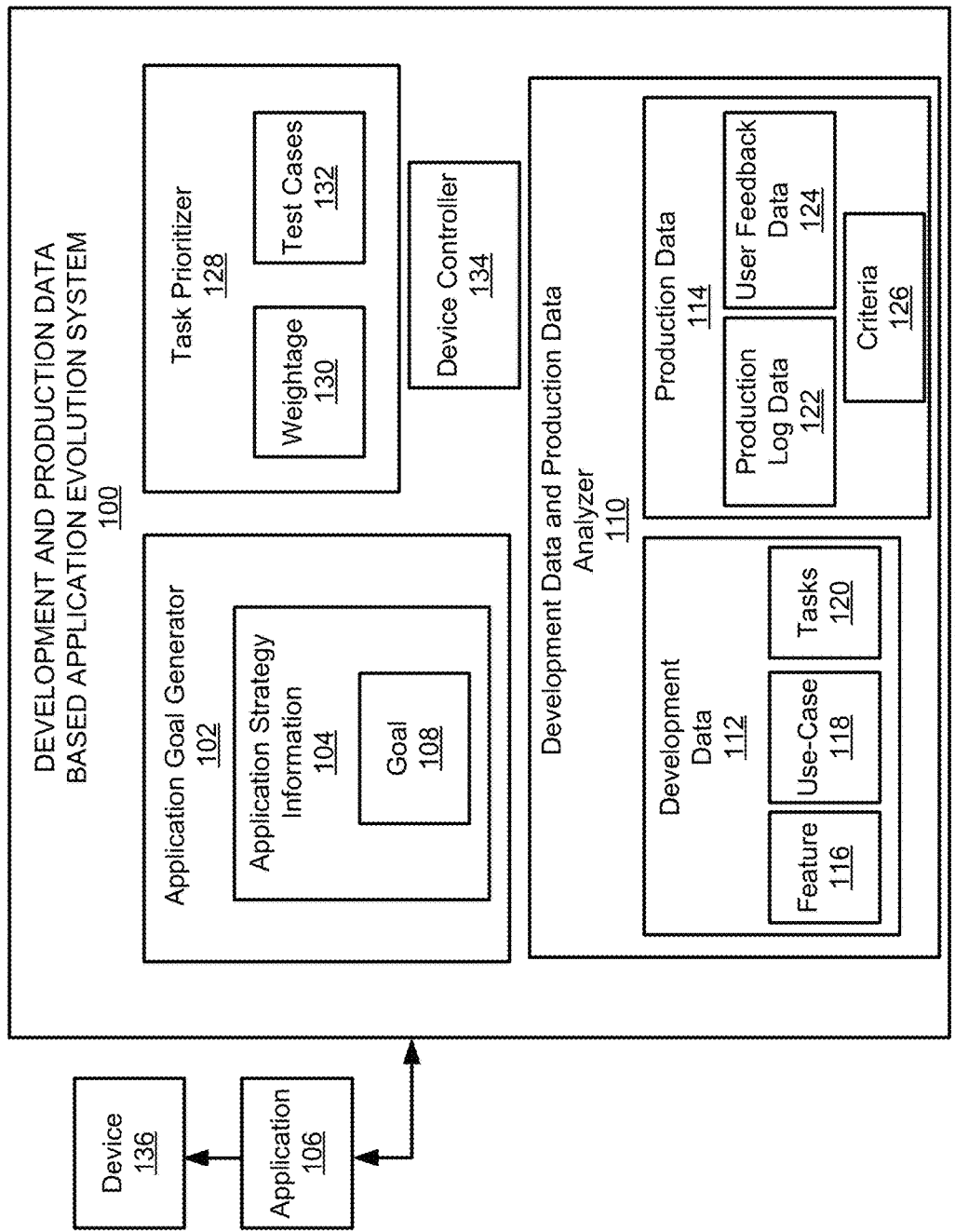
FIG. 1 illustrates an architecture of a development and production data based application evolution system, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, methods and structures apparent to one of ordinary skill in the art have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, a development and production data based application evolution system, a method for development and production data based application evolution, and a non-transitory computer readable medium having stored thereon a computer executable program to provide development and production data based application evolution are disclosed herein. According to examples, the system, method, and non-transitory computer readable medium disclosed herein may create traceability between organizational strategies and goals, application strategy, and software release plans. The system, method, and non-transitory computer readable medium disclosed herein may implement a set of data analyses based on post release data and software development data. The data analyses may be used to provide feedback for optimizing strategies and release plans for continuously evolving an application to achieve intended organizational strategies and goals. The analysis of post release data may be used to determine actionable insights to inform on the value of an application, features that need to be focused on for future releases of the application, and a development plan of how those features are to be released.

The system, method, and non-transitory computer readable medium disclosed herein may implement the analysis of post release data (e.g., customer feedback, user behavior data, application traces, etc.) for providing contextual guidance with respect to future releases of an application.

For the system, method, and non-transitory computer readable medium disclosed herein, application evolution may begin with organizational objectives for an application. Based on the organizational objectives, various requirements may be specified for the application. In this regard, an application lifecycle may include requirements and prototypes, design and models, development of the application, testing of the application, and deployment and release of the application. For each of these aspects of the application lifecycle, various insights may be ascertained. For example, features insights for requirements and prototypes may be based on and/or used for prioritizing feature lists, features that are to be focused on, etc. Development insights may be based on and/or used for robustness of components of the application, re-organization of teams based on defects associated with the components of the application, etc. Testing insights may be based on and/or used for test case prioritization, testing focus for non-functional requirements (NFR), test data, etc. Further, release insights may be based on and/or used for customer feedback, user behavior data, competitive application data, etc.

For the system, method, and non-transitory computer readable medium disclosed herein, software development may be described as the process of computer programming, documenting, testing, and defect fixing involved in creating and maintaining applications and frameworks involved in a software release life cycle and resulting in a software product.

For the system, method, and non-transitory computer readable medium disclosed herein, an application may be described as an application program, which is a computer program designed to perform activities, tasks, or a group of specified functions. Examples of an application include a word processor, a spreadsheet, an accounting application, a web browser, etc. An implemented application may be described as a realization of a technical and/or visual specification or algorithm as a program, software component, or other computer system through computer programming and deployment. Different types of implemented applications may exist for a given specification or standard.

For the system, method, and non-transitory computer readable medium disclosed herein, an application strategy may be described as the creation of a flexible and actionable map that guides the selection, deployment, operation, and refresh of an organization's application and technology landscape. The strategy may also facilitate identification of application features relevant for users as well as a customer guided application evolution.

For the system, method, and non-transitory computer readable medium disclosed herein, a requirement specification may be described as a set of documented requirements to be satisfied by a material, design, product, or service.

For the system, method, and non-transitory computer readable medium disclosed herein, software testing may be described as an investigation conducted to provide information about the quality of a product or service under test. Software testing may also provide an objective, independent view of the software to allow an organization to appreciate and understand the risks of software implementation. Test techniques may include the process of executing a program or application with the intent of identifying software defects.

For the system, method, and non-transitory computer readable medium disclosed herein, regression testing may be described as a type of software testing that verifies that software previously developed and tested still performs correctly after it was changed or interfaced with other software. Changes may include software enhancements, patches, configuration changes, etc. During regression testing, new software defects or regressions may be identified. To reduce the cost of regression testing, software testers may prioritize their test cases so that those which are more important, by some measure, are executed earlier in the regression testing process. A potential goal of such prioritization is to increase a test suite's rate of fault detection.

For the system, method, and non-transitory computer readable medium disclosed herein, a test suite may be described as a collection of test cases that are intended to be used to test a software program (e.g., implemented application to show that the application has same specified set of behaviors which were mentioned in the specifications). A group of test cases may also contain prerequisite states or steps, and descriptions of the following tests. A test case may include single step or a sequence of steps to test the correct behavior, functionality, and/or features of an application (based on the specifications).

For the system, method, and non-transitory computer readable medium disclosed herein, customer application feedback data may be described as information originating directly from customers with respect to the satisfaction or dissatisfaction they feel about the usage of an application. Customer comments and complaints provided to an organization may represent a relevant resource for improving and addressing the needs and wants of a customer. This information may be procured through written texts, comments, etc., about the application.

For the system, method, and non-transitory computer readable medium disclosed herein, user behavioral data analytics may be described as the use of seemingly unrelated data points in order to extrapolate, predict, and determine errors and future trends. User behavioral data analytics may take a more holistic and human view of data, connecting individual data points to determine what is happening, as well as how and why something is happening. This information may facilitate the gaining of a competitive advantage by discovering hidden defects, recommending application optimization opportunities, and enhancing user experience.

For the system, method, and non-transitory computer readable medium disclosed herein, with respect to continuous application evolution, customer feedback and user behavioral data, which is available post deployment of an application, may represent a relevant source for analysis, and for gaining insights towards evolution of next versions (i.e., releases) of an application based on the user feedback. The insights may be useful to predict most used or least used application features, and to define the next version application strategy based on such predictions. The insights may also be useful to prioritize the test suite for regression testing for a next version based on the available insights such as traversed paths, most used features, etc.

With respect to enterprises that focus on the continuous innovation and adaptation to an ever-changing ecosystem, the system, method, and non-transitory computer readable medium disclosed herein may provide for the implementation of adaptive software engineering which includes a virtually constant feedback loop from post release data, which facilitates refinement of application strategy, and which facilitates software release planning. This process may be described as an iterative process which may be applied to successive application releases based on the previous release data, customer feedback, user behavioral, and other competitive application data. The availability of different types of data in the software development life cycle may affect the decision taking ability for application strategy or release planning. The insights may be applied towards evolution of the application based on customer inputs.

For the system, method, and non-transitory computer readable medium disclosed herein, customer feedback data may be used to ascertain insights on the features which are not working, mostly or least used, or for evolution of sub-features of an application. Based on the customer usage and/or behavior data, insights may be ascertained on traces of the application which are highly used or least used, or the traces which may be used to prioritize test cases and hence facilitate release planning. Further, based on analysis of competitive applications and their ratings, insights may be ascertained on the competitive application features which are highly used and appreciated, and the features that operate correctly and the features that do not operate correctly, hence facilitating building of the strategy of an organization for a next release of an application.

In order to implement continuous application evolution, the system, method, and non-transitory computer readable medium disclosed herein may implement a perpetual continuous shift left and shift right testing approach that applies artificial intelligence technologies to diverse and latent data for gaining a competitive advantage by discovering hidden defects, recommending application optimization opportunities, and enhancing user experience. The insights from the data provide for the re-defining of application strategy for new releases based on information related to mostly used or least used, and defective features. The insights from the data provide for the reorganization of development and testing resources based on information related to features which are not-working, and defects which are continuously present since previous releases. Further, the insights from the data provide for the definition of a testing strategy for regression testing of new releases. These insights may provide data to prioritize test cases which may increase a test suite's rate of fault detection. In this regard, an improved rate of fault detection may provide earlier feedback on a system under test, and enable earlier defect resolution.

The development and production data based application evolution system, the method for development and production data based application evolution, and the non-transitory computer readable medium having stored thereon a computer executable program to provide development and production data based application evolution disclosed herein provide technical solutions to technical problems, related, for example, to continuous application development. In many instances, there is a boundary between the software development, and the post release environment. The software development side, and the post release environment side include distinct sets of personnel, information needs, and data. In this regard, it is challenging to analyze the post release data, correlate the analysis outcomes with the development data, and provide actionable and contextual guidance to the different personnel. The system, method, and non-transitory computer readable medium disclosed herein may implement the collection of data from the post release environment, where the data is analyzed, for example, by using artificial intelligence, and analytics techniques such as natural language processing, sentiment analysis, graph analysis, and correlations to create a coherent model of the impact of a new release of an application on users of the application. Based on this post-release model, the system, method, and non-transitory computer readable medium disclosed herein may map the information to various data elements in the development context (e.g., feature usage to user stories, functional defects to developers, prioritized test and device configuration plans, etc.). The analysis outcomes and insights provided by the system, method, and non-transitory computer readable medium disclosed herein reduce the testing phase time of the next release, and hence provide for a faster release of an application. The system, method, and non-transitory computer readable medium disclosed herein also provide for focusing on prioritized tests, and hence increasing, based on the implementation of the prioritized tests, of the stability of an application. For the system, method, and non-transitory computer readable medium disclosed herein, the increase in the stability of the application as disclosed herein provides further technical benefits such as a reduction in resource utilization of a computing device (e.g., a computer, a mobile phone, etc.) on which the application operators, and an increase in the processing speed of the computing device. For example, the increase in the stability of the application as disclosed herein provides for reduction in resource utilization of a computing device and increase in the processing speed of the computing device by eliminating (or reducing) errors, crashes, and other unintended operations of an application.

FIG. 1 illustrates an architecture of a development and production data based application evolution system 100, according to an example of the present disclosure.

Referring to FIG. 1, an application goal generator 102 may ascertain application strategy information 104 for a specified release (e.g., release-n) of an application 106. The application goal generator 102 may be designated as an application goal hardware generator 102 that includes a hardware processing circuit, to execute the methods, functions and other processes described herein, or alternatively, the application goal generator 102 may be executed by at least one hardware processor (e.g., the processor 1602 of FIG. 16 and/or the processor 1804 of FIG. 18). The application goal generator 102 may determine, from the application strategy information 104 for the specified release of the application 106, a goal 108 for the specified release of the application 106.

A development data and production data analyzer 110 may ascertain development data 112 and production data 114 for the specified release of the application 106. The development data and production data analyzer 110 may be designated as a development data and production data hardware analyzer 110 that includes a hardware processing circuit, to execute the methods, functions and other processes described herein, or alternatively, the development data and production data analyzer 110 may be executed by at least one hardware processor (e.g., the processor 1602 of FIG. 16 and/or the processor 1804 of FIG. 18). The development data and production data analyzer 110 may determine, from the development data 112 for the specified release of the application 106, a feature 116 associated with the specified release of the application 106, at least one use-case 118 associated with the feature 116, and a plurality of tasks 120 associated with the at least one use-case 118. The development data and production data analyzer 110 may determine, from the production data 114, production log data 122 and user feedback data 124 associated with operation of the specified release of the application 106. The development data and production data analyzer 110 may determine, from the production log data 122 and the user feedback data 124, criteria 126 associated with the specified release of the application 106.

A task prioritizer 128 may ascertain a weightage 130 for each criterion of the criteria 126 associated with the specified release of the application 106. The task prioritizer 128 may be designated as a task hardware prioritizer 128 that includes a hardware processing circuit, to execute the methods, functions and other processes described herein, or alternatively, the task prioritizer 128 may be executed by at least one hardware processor (e.g., the processor 1602 of FIG. 16 and/or the processor 1804 of FIG. 18). The task prioritizer 128 may determine, based on the weightage 130 for each criterion of the criteria 126 associated with the specified release of the application 106, a task priority for each task of the plurality of tasks 120 to be applied to a different release (e.g., release (n+1)) of the application 106. The task prioritizer 128 may apply, based on the determination of the task priority for each task of the plurality of tasks 120 to be applied to the different release of the application 106, test cases 132 associated with a highest priority task of the plurality of tasks 120 to the different release of the application 106. Further, the task prioritizer 128 may apply, based on the determination of the task priority for each task of the plurality of tasks 120 to be applied to the different release of the application 106, further test cases associated with remaining tasks of the plurality of tasks 120 in order of the task priority to the different release of the application 106.

According to an example, as disclosed herein with respect to FIGS. 1-3 and 10-15J, the production log data 122 may include crashes associated with a particular display for the specified release of the application 106, errors associated with the particular display for the specified release of the application 106, and/or usage of the particular display for the specified release of the application 106.

According to an example, as disclosed herein with respect to FIGS. 1-9 and 15A-15J, the user feedback data 124 may include issues associated with the specified release of the application 106 and/or popularity associated with the specified release of the application 106.

According to an example, as disclosed herein with respect to FIGS. 1-9 and 15A-15J, the task prioritizer 128 may determine, based on the weightage 130 for each criterion of the criteria 126 associated with the specified release of the application 106, the task priority for each task of the plurality of tasks 120 to be applied to the different release of the application 106 by determining, for each task of the plurality of tasks 120, a number of occurrences of a criterion associated with the user feedback data 124 by performing a natural language processing analysis on the user feedback data 124, identifying, based on the performing of the natural language processing analysis on the user feedback data 124, at least one keyword, and identifying a mapping of the at least one keyword to each task of the plurality of tasks 120, each use-case of the at least one use-case 118, and the feature 116. Further, for each identified mapping of the at least one keyword, the task prioritizer 128 may increase a weightage associated with each corresponding task of the plurality of tasks 120, identify a task of the plurality of tasks 120 including a highest weightage, and increment, for the identified task of the plurality of tasks 120 including the highest weightage, the number of occurrences of the criterion associated with the user feedback data 124.

According to an example, as disclosed herein with respect to FIGS. 1-9 and 15A-15J, the task prioritizer 128 may determine, based on the weightage 130 for each criterion of the criteria 126 associated with the specified release of the application 106, the task priority for each task of the plurality of tasks 120 to be applied to the different release of the application 106 by determining, for each task of the plurality of tasks 120, a number of occurrences of a criterion associated with the user feedback data 124 by performing a natural language processing analysis on the user feedback data 124, identifying, based on the performing of the natural language processing analysis on the user feedback data 124, at least one keyword, and identifying a mapping of the at least one keyword to each task of the plurality of tasks 120, each use-case of the at least one use-case 118, and the feature 116. Further, for each identified mapping of the at least one keyword, the task prioritizer 128 may increase a weightage associated with each corresponding task of the plurality of tasks 120. The task prioritizer 128 may determine whether a task of the plurality of tasks 120 includes a highest weightage. In response to a determination that no task of the plurality of tasks 120 includes the highest weightage, the task prioritizer 128 may identify tasks of the plurality of tasks 120 that include a same highest weightage. The task prioritizer 128 may increment, for the identified tasks of the plurality of tasks 120 that include the same highest weightage, the number of occurrences of the criterion associated with the user feedback data 124.

According to an example, as disclosed herein with respect to FIGS. 1-3 and 10-15J, the task prioritizer 128 may determine, based on the weightage 130 for each criterion of the criteria 126 associated with the specified release of the application 106, the task priority for each task of the plurality of tasks 120 to be applied to the different release of the application 106 by determining, for each task of the plurality of tasks, a number of occurrences of a criterion associated with the production log data 122 by identifying displays associated with the specified release of the application 106, identifying, for each display of the displays associated with the specified release of the application 106, at least one criterion of the criteria 126, and identifying a mapping of each display of the displays associated with the specified release of the application 106 and the at least one criterion of the criteria 126 to each task of the plurality of tasks 120. For each identified mapping, the task prioritizer 128 may increase a weightage associated with each corresponding task of the plurality of tasks 120. The task prioritizer 128 may identify a task of the plurality of tasks 120 including a highest weightage. The task prioritizer 128 may increment, for the identified task of the plurality of tasks 120 including the highest weightage, the number of occurrences of the criterion associated with the production log data 122.

According to an example, as disclosed herein with respect to FIGS. 1-3 and 10-15J, the task prioritizer 128 may determine, based on the weightage 130 for each criterion of the criteria 126 associated with the specified release of the application 106, the task priority for each task of the plurality of tasks 120 to be applied to the different release of the application 106 by determining, for each task of the plurality of tasks 120, a number of occurrences of a criterion associated with the production log data 122 by identifying displays associated with the specified release of the application 106, identifying, for each display of the displays associated with the specified release of the application 106, at least one criterion of the criteria 126, and identifying a mapping of each display of the displays associated with the specified release of the application 106 and the at least one criterion of the criteria 126 to each task of the plurality of tasks 120. For each identified mapping, the task prioritizer 128 may increase a weightage associated with each corresponding task of the plurality of tasks 120. The task prioritizer 128 may determine, whether a task of the plurality of tasks 120 includes a highest weightage. In response to a determination that no task of the plurality of tasks 120 includes the highest weightage, the task prioritizer 128 may identify tasks of the plurality of tasks 120 that include a same highest weightage. The task prioritizer 128 may increment, for the identified tasks of the plurality of tasks 120 that include the same highest weightage, the number of occurrences of the criterion associated with the production log data 122.

According to an example, as disclosed herein with respect to 15A-15J, the task prioritizer 128 may determine, based on the weightage 130 for each criterion of the criteria 126 associated with the specified release of the application 106, the task priority for each task of the plurality of tasks 120 to be applied to the different release of the application 106 by determining, for each task of the plurality of tasks 120, a number of occurrences of each criterion of the criteria 126 respectively associated with the production log data 122 or the user feedback data 124. Further, the task prioritizer 128 may determine, for each criterion of the criteria 126, an averaging-based weightage value by dividing a number of occurrences of a criterion for a task by a total number of occurrences of the criterion for the plurality of the tasks 120. The task prioritizer 128 may determine a global priority of each task by determining, for each criterion of the criteria 126, a product of the weightage ascertained for a respective criterion and the averaging-based weightage value for the respective criterion, and determining a total of each of the products for each criterion of the criteria 126. Further, the task prioritizer 128 may ascertain, for each task of the plurality of tasks 120, a feature priority, and determine, for each task of the plurality of tasks 120, the task priority by determining a product of the global priority of a corresponding task and the feature priority of the corresponding task.

According to an example, a device controller 134 may operate the application 106 to control operation of a physical device 136, such as an automatic teller machine (ATM), a goods dispenser (e.g., a soft-drink dispenser), and generally, any physical machine that may be controlled to perform an operation. The device controller 134 may be designated as a device hardware controller 134 that includes a hardware processing circuit, to execute the methods, functions and other processes described herein, or alternatively, the device controller 134 may be executed by at least one hardware processor (e.g., the processor 1602 of FIG. 16 and/or the processor 1804 of FIG. 18). For the device 136 that includes an ATM, the device 136 may also be used to perform the "money transfer" and "balance inquiry" operations as disclosed herein. According to an example, the device controller 134 may receive input from the device 136 that is to be controlled. The input may include, for example, the production data 114. As disclosed herein, the application 106 may be modified (e.g., for a next release n+1 as disclosed herein) based on the production data 114 and other factors related to the device 136, and the modified application 106 may be used to further control the device 136. As disclosed herein, the task prioritizer 128 may provide for focusing on prioritized tests, and hence increasing, based on the implementation of the prioritized tests, of the stability of the application 106. The increase in the stability of the application 106 as disclosed herein provides technical benefits such as a reduction in resource utilization of a computing device (e.g., a computer, a mobile phone, etc.) on which the application 106 operators, and an increase in the processing speed of the computing device. In this regard, the computing device may be part of the device 136 or operate separately from the device 136. For example, the increase in the stability of the application 106 as disclosed herein provides for reduction in resource utilization of the computing device and increase in the processing speed of the computing device by eliminating (or reducing) errors, crashes, and other unintended operations of the application 106.

In some examples, the elements of the system 100 may be machine readable instructions stored on a non-transitory computer readable medium. In this regard, the system 100 may include or be a non-transitory computer readable medium. In some examples, the elements of the system 100 may be hardware or a combination of machine readable instructions and hardware.

Figure 2:
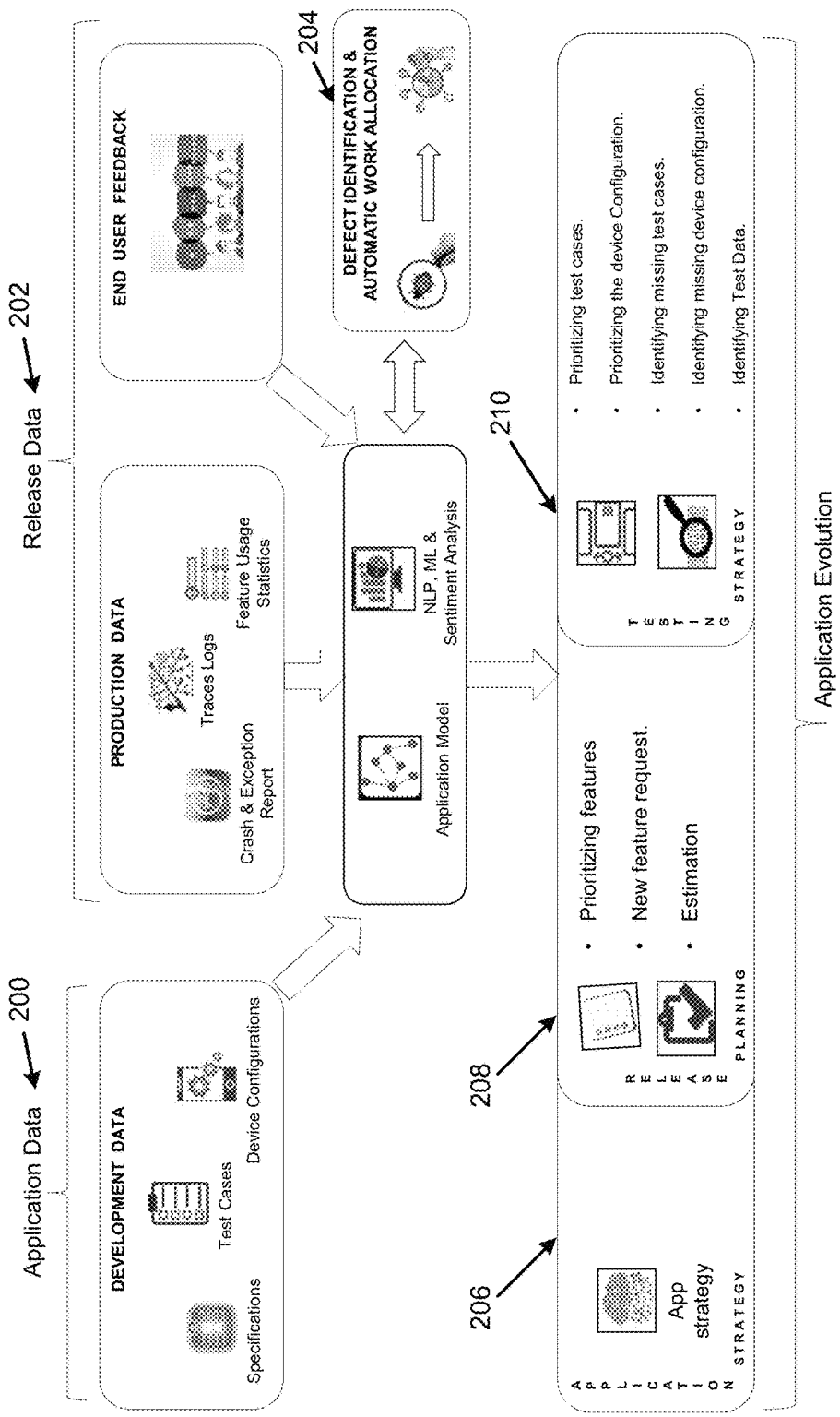
FIG. 2 illustrates continuous application evolution for the development and production data based application evolution system of FIG. 1, according to an example of the present disclosure.

FIG. 2 illustrates continuous application evolution for the system 100, according to an example of the present disclosure.

Referring to FIG. 2, continuous application evolution may be based on application data 200 that includes development data, and release data 202 that includes production data (e.g., production log data 122) and end user feedback (e.g., user feedback data 124). The development data may be based on specifications for the application 106, test cases related to the application 106, and device configurations that are used for testing of the application 106. The production data may be based on crash and exception reports related to the application 106, trace logs related to the application 106, and feature usage statistics related to the application 106. The end user feedback may be received from various data sources such as e-commerce websites, questionnaires, social networking websites, etc. The application data 200, the release data 202, and data related to defect identification and work allocation at 204 may be analyzed to generate an application model, and analyzed by various techniques, such as, natural language processing, machine learning, sentiment analysis, etc. The results of the analysis to generate the application model, and the natural language processing, machine learning, and sentiment analysis may be used for release planning of the application 106 (e.g., with respect to different releases of the application 106), and for test strategy determination. Test strategies may be used for prioritizing test cases, prioritizing a device configuration, identifying missing test cases, identifying a missing device configuration, and identifying test data. The application strategy at 206 (which includes the application strategy information 104), release planning at 208, and testing strategy at 210 may be used to continue to evolve the application 106 as disclosed herein.

Figure 3:
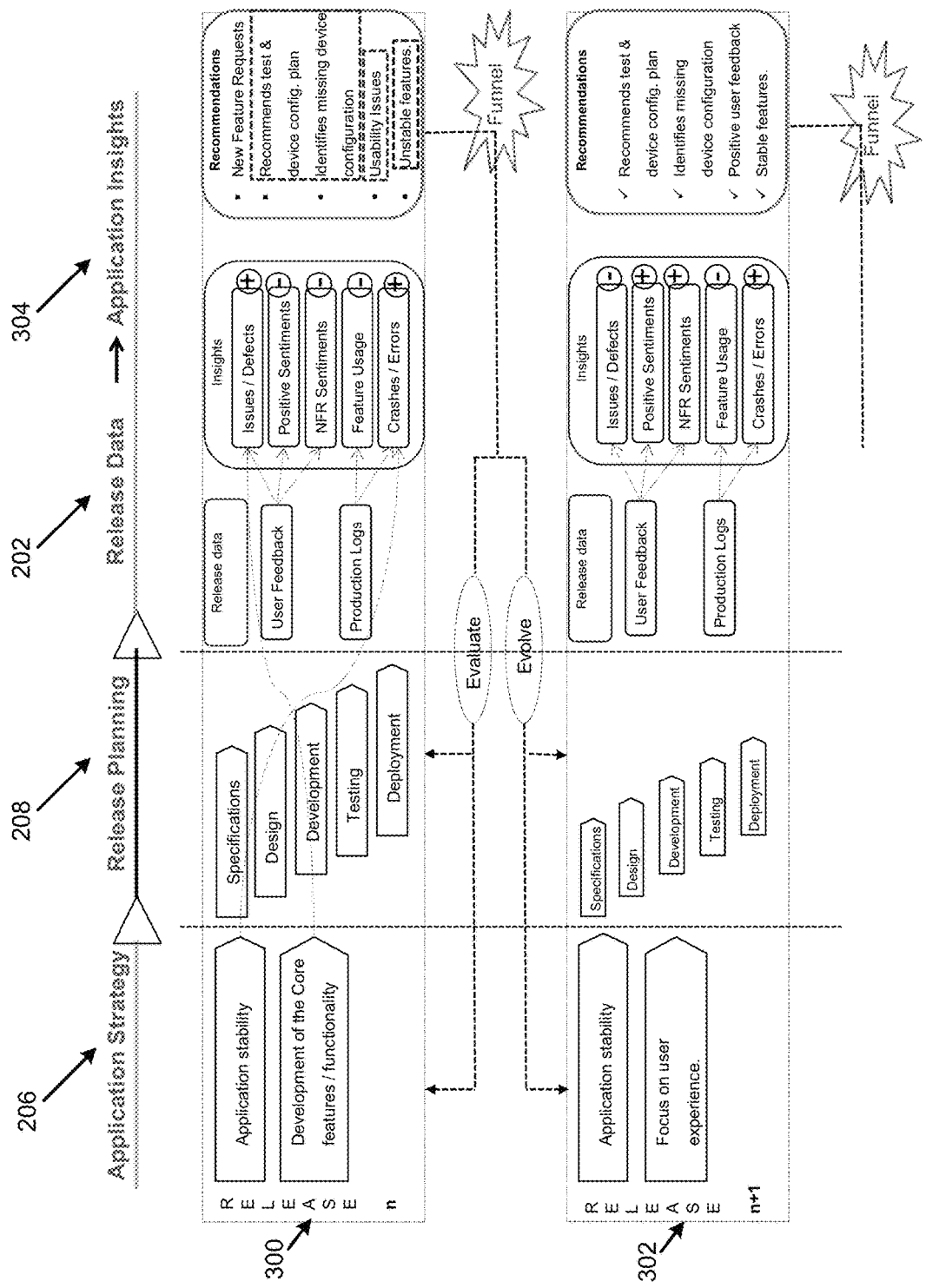
FIG. 3 illustrates aspects related to different releases of an application for the development and production data based application evolution system of FIG. 1, according to an example of the present disclosure.

FIG. 3 illustrates aspects related to different releases of an application for the system 100, according to an example of the present disclosure.

As disclosed herein with respect to FIG. 2, the application strategy at 206, release planning at 208, and testing strategy at 210 may be used to continue to evolve the application 106. With respect to the application strategy at 206, for release-n at 300, "application stability" and "development of the core features/functionality" may represent the highest priority goals for application strategy. The task prioritizer 128 may analyze the goals for task prioritization for further releases (i.e., release (n+1) at 302) of the application 106 as disclosed herein with respect to FIGS. 5-15J.

The release planning at 208 may include aspects of "specifications", "design", "development", "testing", and "deployment" that are based on the application strategy for release-n at 300.

Once the application 106 is deployed, various types of release data 202 may be used to ascertain application insights 304. The insights 304 may include the criteria 126 used by the task prioritizer 128 for task prioritization as disclosed herein with respect to FIGS. 5-15J. The release data 202 may include user feedback (i.e., the user feedback data 124) and production log data 122. The user feedback data 124 and the production log data 122 may be used to ascertain the criteria 126 that are analyzed, in conjunction with the goals, by the task prioritizer 128 for task prioritization as disclosed herein with respect to FIGS. 5-15J.

The user feedback data 124 may be used to ascertain insights such as "issues/defects" related to the application 106 (e.g., based on negative sentiments), "positive sentiments", and "non-functional requirement sentiments" (e.g., application is taking too long to perform a task) related to the application 106. An issue may be described as an aspect related to the functionality of the application 106, and a defect may be described an aspect related to an incorrect operation of the application 106.

The production log data 122 may be used to ascertain "feature usage" (e.g., which feature is used most or least), and "crashes/errors" related to the application 106. A crash may be described as an event which results, for example, in un-intended shut-down of the application 106, and an error may be described as a result or message that is generated based on an incorrect operation of the application 106.

The ascertained insights may be mapped to the application strategy 206. For example, the "application stability" is mapped to "crashes/errors", and the "development of the core features/functionality" is mapped to the "issues/defects". In this regard, an increase in "crashes/errors" may be used to determine that application stability is negatively affected. As disclosed herein, the increase in the stability of the application provides for reduction in resource utilization of a computing device (e.g., on the device 136, or that operates the device 136) and increase in the processing speed of the computing device by eliminating (or reducing) errors, crashes, and other unintended operations of the application 106.

The insights may be prioritized based on the application strategy 206. For example, since application stability includes a higher priority for the application strategy 206, the weight assigned to "crashes/errors" may be increased accordingly so that "crashes/errors" include the highest priority. Alternatively, separate weights may be assigned to crashes and errors as disclosed herein with respect to FIGS. 15A-15J. Further, since "development of the core features/functionality" includes a second or lower priority compared to application stability, the weight assigned to "issues/defects" is decreased accordingly so that "issues/defects" includes a lower priority. The other insight criteria such as "positive sentiments", "non-functional requirement sentiments", and "feature usage" may be assigned yet further lower weights compared to "crashes/errors", and "issues/defects".

Based on the mapping of the insights to the application strategy 206, and the analysis of the "issues/defects", the "positive sentiments", the "non-functional requirement sentiments", the "feature usage", and the "crashes/errors" related to the application 106, various recommendations may be generated for the next release (i.e., the release (n+1) at 302) of the application 106. Examples of recommendations may include new feature requests, identification of test and device configuration plans, missing device configuration, usability issues, unstable features, etc.

The various recommendations may be reverted back to analyze and determine whether the application strategy aspects have been met. Based on the analysis of the recommendations and application strategy aspects, for release (n+1) of the application 106 at 302, the application strategy 206 may include "application stability" as a highest priority, and "focus on user experience" as a second highest priority. Release (n+1) of the application 106 may be analyzed in a similar manner as release-n of the application 106 to generate the recommendations as "recommends test and device configuration plan", "identifies missing device configuration," "positive user feedback", and "stable features". Based on the "positive user feedback", and "stable features", the application strategy may be considered to be met for release (n+1) of the application 106 with respect to the "usability issues" and "unstable features" for release-n of the application 106. However, with respect to the other recommendations of "recommends test and device configuration plan", and "identifies missing device configuration," the insights of "crashes/errors" may be assigned the highest weight, followed by "positive sentiments" and "non-functional requirement sentiments", and further followed by "issues/defects" and "feature usage".

Figure 4:
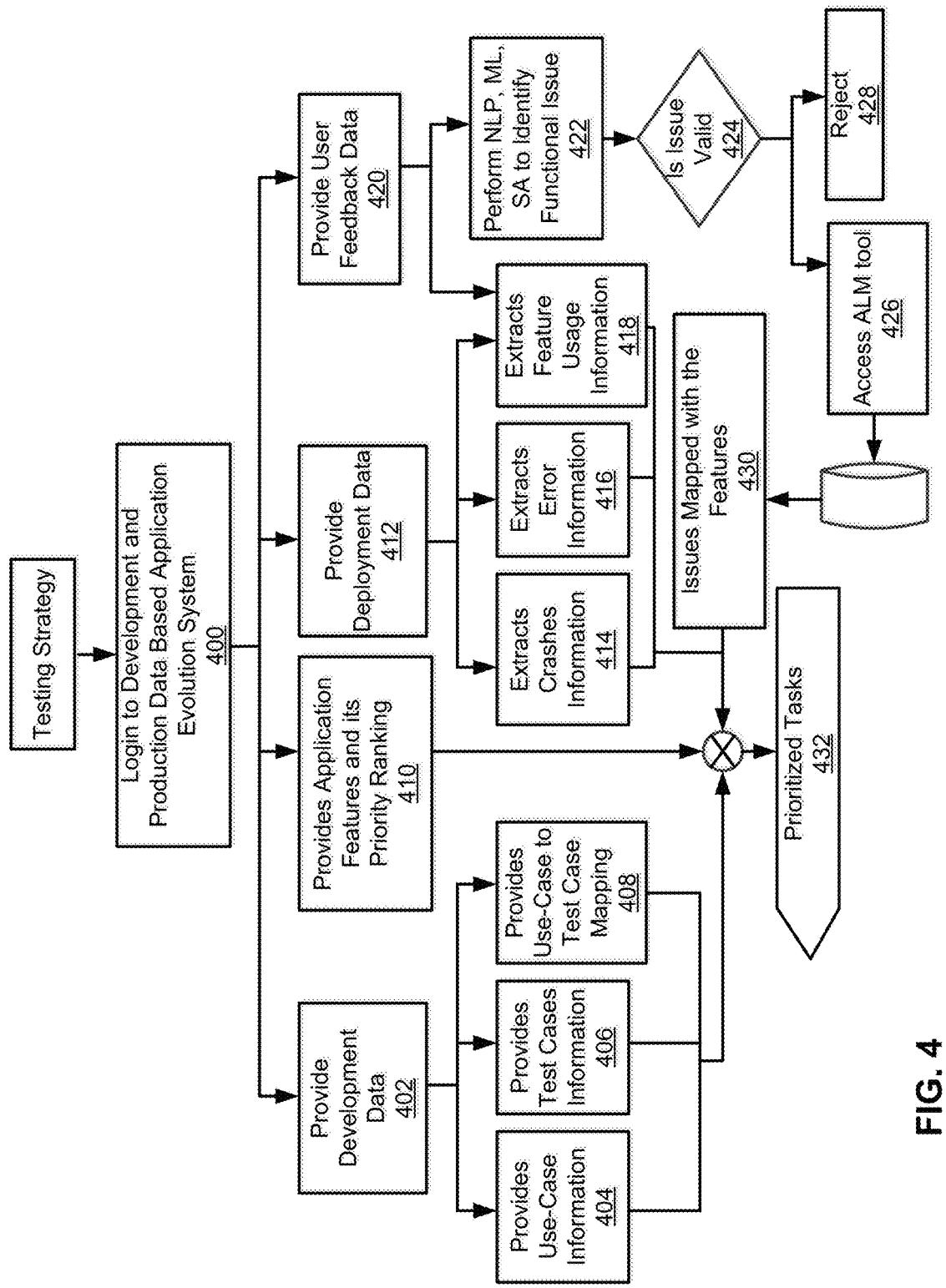
FIG. 4 illustrates a test strategy scenario for the development and production data based application evolution system of FIG. 1, according to an example of the present disclosure.

FIG. 4 illustrates a test strategy scenario for the system 100, according to an example of the present disclosure. The test strategy scenario may represent a flow of information for determination of a testing strategy for a further release (i.e., release (n+1) at 302) of the application 106.

Referring to FIG. 4, with respect to determination of a testing strategy, at block 400, the test strategy scenario may commence upon login to the system 100. With respect to determination of a testing strategy, the system 100 may prioritize tasks 120 as disclosed herein, where the tasks include test cases.

At block 402, development data (from the application data 200 of FIG. 2) may be ascertained. The development data may be used to determine use-case information at block 404, test cases information at block 406, and use-case to test case mapping at block 408. The aspect of use-cases, test cases, and use-case to test case mapping is described in further detail with respect to FIG. 5.

At block 410, application features and priority rankings may be ascertained. The priority rankings may pertain to the weights (based on priority) assigned to the criteria 126 as disclosed herein with respect to FIG. 15B.

At block 412, deployment data (i.e., production log data 122) may be used to extract crash information at block 414, error information at block 416, and feature usage information at block 418. As disclosed herein, the crash information at block 414, error information at block 416, and feature usage information at block 418 may represent the criteria 126 that are analyzed by the task prioritizer 128 to prioritize tasks.

At block 422, natural language processing, machine learning, and sentiment analysis may be performed on the user feedback data 124 from block 420 to identify functional issues. As disclosed herein, the functional issues derived from the user feedback data 124 may also represent the criteria 126 that are analyzed by the task prioritizer 128 to prioritize tasks.

At block 424, a determination may be made as to whether a functional issue is valid.

In response to a determination that the functional issue is valid, at block 426, an application lifecycle management (ALM) tool may be accessed.

In response to a determination that the functional issue is invalid, at block 428, the functional issue may be rejected.

At block 430, the functional issue identified at block 422 may be mapped with features of the application 106. Mapping of the functional issue with the features of the application 106 is disclosed in further detail with respect to FIGS. 5-10.

At block 432, the output from blocks 404, 406, 408, 410, 414, 416, 418, and 430 may be analyzed to determine a testing strategy, where the testing strategy includes a set of prioritized tasks 120.

Figure 5:
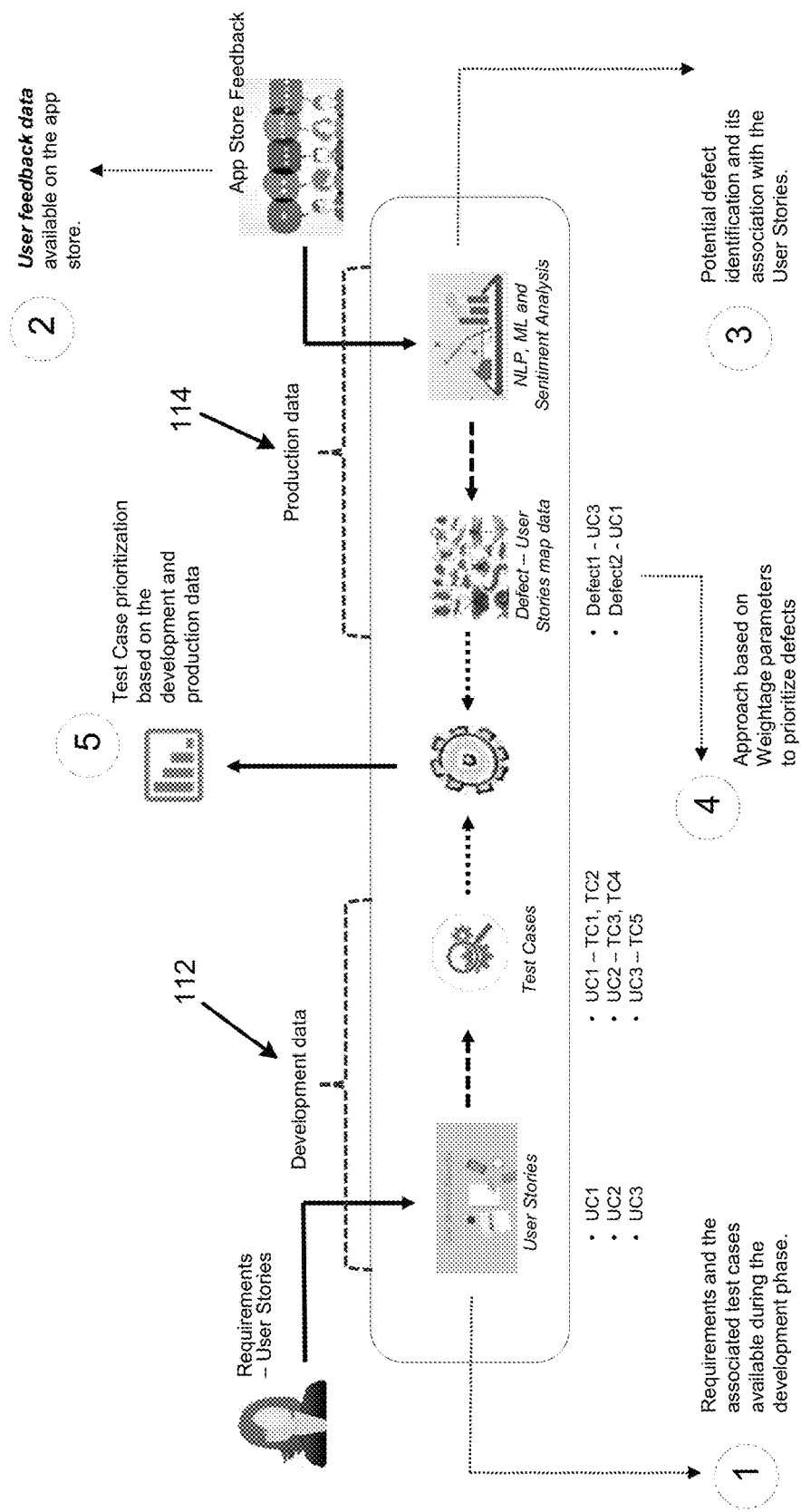
FIG. 5 illustrates task prioritization (for test case prioritization) with respect to development data and production data including user feedback data for the development and production data based application evolution system of FIG. 1, according to an example of the present disclosure.

FIG. 5 illustrates task prioritization (for test case prioritization) with respect to development data and production data including user feedback data for the system 100, according to an example of the present disclosure.

Referring to location "1" FIG. 5 (and location "1" of FIG. 10 discussed below), with respect to task prioritization, the development data (from the application data 200 of FIG. 2) may include the requirements (i.e., user stories, specified as use-case-1 (UC1), use-case-2 (UC2), etc.) and test cases (specified as TC1, TC2, etc.). These requirements and test cases may be modeled and stored as the data structure depicted in FIG. 6. Assuming that a requirement is captured using, for example, an agile methodology, whereas an epic (i.e., feature of the application 106) forms the Level-1 (L1) of the requirement, epic may be subsequently broken down into Level-2 (L2) which represents use-cases which are further broken into more granular levels known as tasks as Level-3 (L3). The test cases may be derived and/or written at the tasks level and map back to use-cases, and then to the feature. A feature may be described as a high level operation (e.g., money transfer, balance inquiry, etc.) of the application 106. A use-case may be described as a function (e.g., transfer of money using National Electronic Funds Transfer (NEFT) transaction, transfer of money using Immediate Payment Service (IMPS) transaction, etc.) under the high level operation performed by the application 106. A task may be described as a sub-operation (e.g., system should generate the one time password (OTP) request for the security validation, etc.) performed by the application 106 to implement the use-case. Further, the task may include the test cases (e.g., testing of the OTP request functionality, etc.) to test and/or modify the tasks performed by the application 106.

For each L1 (epic), the task prioritizer 128 may create a vector of keywords (i.e., an Epic_vector) describing the epic. The Epic_vector may include all keywords present in the epic description. Similarly, the task prioritizer 128 may create subset vectors for use-cases and tasks to obtain Use-case_vectors and Task_vectors. The task prioritizer 128 may perform natural language processing on the stored requirements (from the development data) to identify keyword vectors.

For each task and use-case, the task prioritizer 128 may retrieve the set of associated test cases, and create a vector of application screens (i.e., Task_screen_vectors) implemented for the task. The Task_screen_vectors may include all of the application screens present in the set of test cases. The task prioritizer 128 may perform natural language processing on the stored tests (from the development data) to identify the associated screens with respect to the tests, i.e., "screens<–>test" which eventually maps to the tasks, i.e., "screens<–>task".

A user, such as an application owner, may provide the prioritization to the epics and features for determining the test strategy. The prioritization to the epics and features may be ascertained as the Epic_weight. The task prioritizer 128 may capture the feature priority based, for example, on the user input, and store the feature priority.

Referring to location "2" FIG. 5 (and location "2" of FIG. 10 discussed below), the production data 114 may include data related to user feedback data 124 and production log data 122. If user feedback data 124 is available, the task prioritizer 128 may perform sentiment analysis on the user feedback data 124 to categorize the user feedback data 124 under positive, negative, and neutral categories.

Referring to location "3" FIG. 5 (and location "4" of FIG. 10 discussed below), with respect to user feedback data 124, the task prioritizer 128 may identify and map the potential defects from negative reviews to tasks [L3], use-cases [L2], and features [L1]. For each negative review, the task prioritizer 128 may create a vector of keywords (i.e., an Issue_vector) describing the issue. Thus, for each negative review, the task prioritizer 128 may determine the issue_weightage and map the issue_weightage to the task. The Issue_vector may include the set of keywords mentioned in the user feedback data 124. The task prioritizer 128 may begin processing at L3 (tasks) level. In this regard, the task prioritizer 128 may perform a cosine vector comparison of the Issue_vector with the task_vectors to identify which tasks are potentially impacted by the defect. Based on a keyword match, the task prioritizer 128 may assign the weightage to the task, and set a need_process flag of its parent (i.e., use-cases) to true. In case of no match at the task level, all of the use-cases may be considered for processing. Otherwise, only those use-cases for which the need_process flag is set to true may be considered for processing. The cosine vector comparison may be performed for the issue_vector and the potential use-case_vectors. Based on a keyword match, the weightage may be assigned to the use-case and the need_process flag of its parent (i.e., epic) may be set to true. In case of no match at the use-case level, all of the epics may be considered for processing. Otherwise, only those epics for which the need_process flag is set to true may be considered for processing. The cosine vector comparison may be performed for the issue_vector and the potential epic_vectors. Based on the keyword match, the weightage may be assigned to the epic. Further, the task prioritizer 128 may traverse the graph that includes the epic, use-case, and task (e.g., see graphs of FIGS. 6-9), aggregate the weightage starting from epic, use-case, and task, and determine the issue_weightage for each task of the application.

The task prioritizer 128 may identify and map the positive user feedback to tasks (L3), use-cases (L2), and features (L1). For each positive review, the task prioritizer 128 may create a vector of keywords (i.e., popularity_vector) describing the popularity, where the popularity_vector includes the set of keywords mentioned in the user feedback data 124. Thus, for each positive review (of the user feedback data 124), the task prioritizer 128 may determine the popularity_weightage and map the popularity_weightage to the task. The task prioritizer 128 may determine the weightage at tasks, use-case, and epic level as disclosed above with respect to starting of the analysis at the L3 (tasks) level (i.e., where the "task prioritizer 128 may begin processing at L3 (tasks) level). Further, the task prioritizer 128 may traverse the graph (e.g., see graphs of FIGS. 6-9), aggregate the weightage starting from epic, use-case, and task, and determine the popularity_weightage for each task of the application.

With respect to user feedback data 124, the task prioritizer 128 may further provide a visualization of the output for verification and editing of the mappings by a user, such as, an application owner. Thus, a user may modify the mappings identified by the task prioritizer 128. In this regard, a user may confirm that the mappings are correct. Alternatively or additionally, the user may reassign the mappings. Alternatively or additionally, the user may assign unmapped defects to any level.

With respect to user feedback data 124, the issue and popularity may represent two criteria available from the user feedback data 124 to prioritize tests. Other criteria may be available from the production log data 122 as disclosed herein. These criteria and associated weightages may be used by the task prioritizer 128 as disclosed herein with respect to determination of priority between the criteria.

With respect to location "4" of FIG. 5, for determination of priority between the criteria, the task prioritizer 128 may prioritize the tasks based on multi-criteria availability. The task level statistics (e.g., issue_weightage, and popularity_weightage), and the criteria priority may be used to prioritize tasks (which have associated test cases), and hence provide a task priority index (referred as task_priority_releasedata) based on the release data. The task prioritizer 128 may apply an epic_weight (i.e., organizational priority) to the task_priority_releasedata to determine the final task priority (task_priority). According to an example, issue_weightage and popularity_weightage criteria may be used to determine the task priority based on release data, and feature priority may be applied to derive the final task priority. The final task priority may be used to determine the prioritized test cases which are derived from the prioritized tasks due to its associativity.

The task prioritizer 128 may prioritize the tasks based on the priority index (i.e., task_priority) of a task. In this regard, a task may include associated test cases, which in turn may be prioritized.

Referring to location "5" of FIG. 5, the output that includes the prioritized tests for the next release of the application 106 based on current release data (i.e., the development data 112 and the production data 114) may be rendered on a user interface and/or downloaded as a test plan document.

Figure 6:
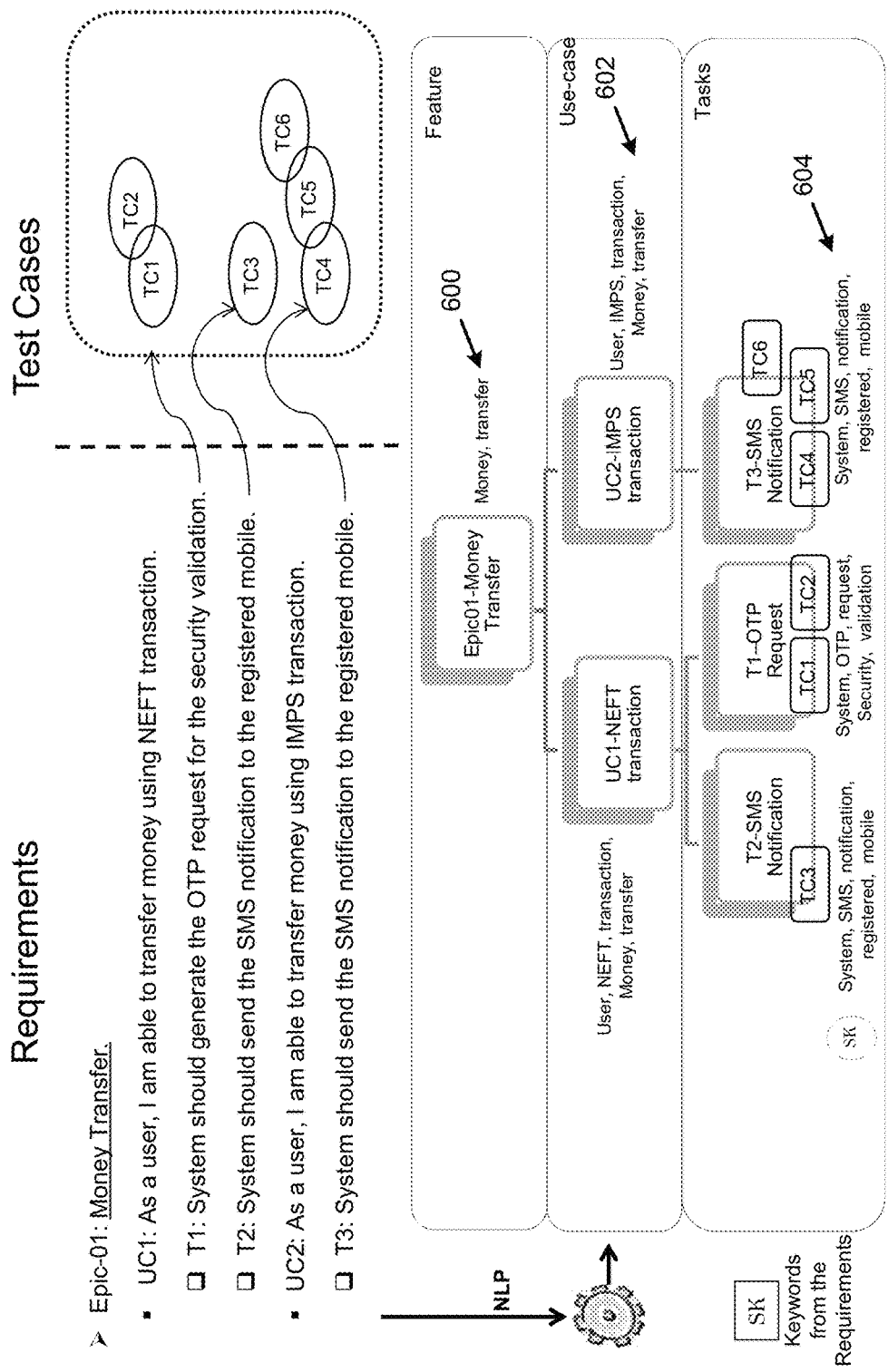
FIG. 6 illustrates requirements and test cases for a money transfer scenario with respect to development data for the development and production data based application evolution system of FIG. 1, according to an example of the present disclosure.

FIG. 6 illustrates requirements and test cases for a money transfer scenario with respect to development data for the system 100, according to an example of the present disclosure.

Referring to FIG. 6, as disclosed herein, the development data 112 may include the requirement (i.e., user stories, specified as use-case-1 (UC1), use-case-2 (UC2), etc.) and test cases (specified as TC1, TC2, etc.). For a money transfer scenario associated with the application 106, the requirements may include "Epic-01: Money Transfer", which includes use-case-1 (UC1) which specifies that "UC1: As a user, I am able to transfer money using NEFT transaction", and associated Task-1 which specifies that "T1: System should generate the OTP request for the security validation", and Task-2 which specifies that "T2: System should send the SMS notification to the registered mobile". Further, the "Epic-01: Money Transfer" may include use-case-2 (UC2) which specifies "UC2: As a user, I am able to transfer money using Immediate Payment Service (IMPS) transaction", and associated Task-3 which specifies that "T3: System should send the SMS notification to the registered mobile." As shown in FIG. 6, T1 maps to TC1 and TC2, T2 maps to TC3, and T3 maps to TC4, TC5, and TC6. As also shown in FIG. 6, the epic (i.e., feature of the application 106) forms the Level-1 (L1) of the requirement, epic may be subsequently broken down into Level-2 (L2) which represents use-cases which are further broken into more granular levels known as tasks at Level-3 (L3). Further, as shown at 600, 602, and 604, the task prioritizer 128 may apply natural language processing to extract keywords for the features, the use-cases, and the tasks. For example, the keywords for the feature "Money Transfer" at 600 include "Money" and "Transfer".

Figure 7:
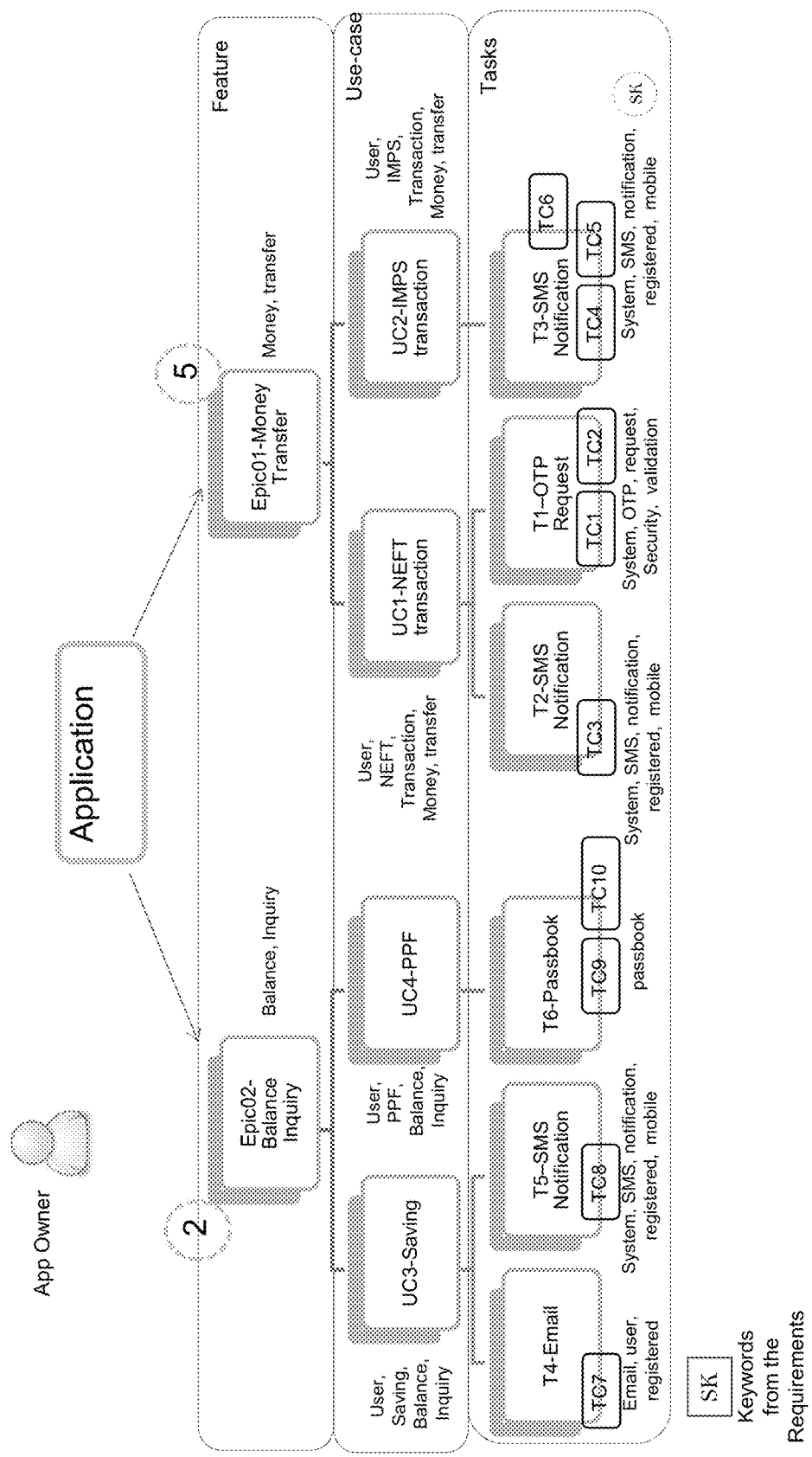
FIG. 7 illustrates a balance inquiry and a money transfer scenario with respect to development data for the development and production data based application evolution system of FIG. 1, according to an example of the present disclosure.

FIG. 7 illustrates a balance inquiry and a money transfer scenario with respect to development data for the system 100, according to an example of the present disclosure.

Similar to FIG. 6, for FIG. 7, the application 106 may include multiple features (e.g., money transfer, balance inquiry, etc.), where the epic (i.e., feature of the application 106) forms the Level-1 (L1) of the requirement, epic may be subsequently broken down into Level-2 (L2) which represents use-cases which are further broken into more granular levels known as tasks at Level-3 (L3). As disclosed herein (e.g., see discussion with respect to FIG. 15I), different weightages may be applied to different features based on their importance, and/or other factors.

User reviews may include positive reviews and negative reviews that are identified through sentiment analysis. For example, a negative review may include "SMS not working", for which, based on an application of natural language processing, the keyword SMS may be identified. Similarly, a negative review may include "SMS not working during NEFT", for which, based on an application of natural language processing, the keywords NEFT and SMS may be identified.

Figure 8:
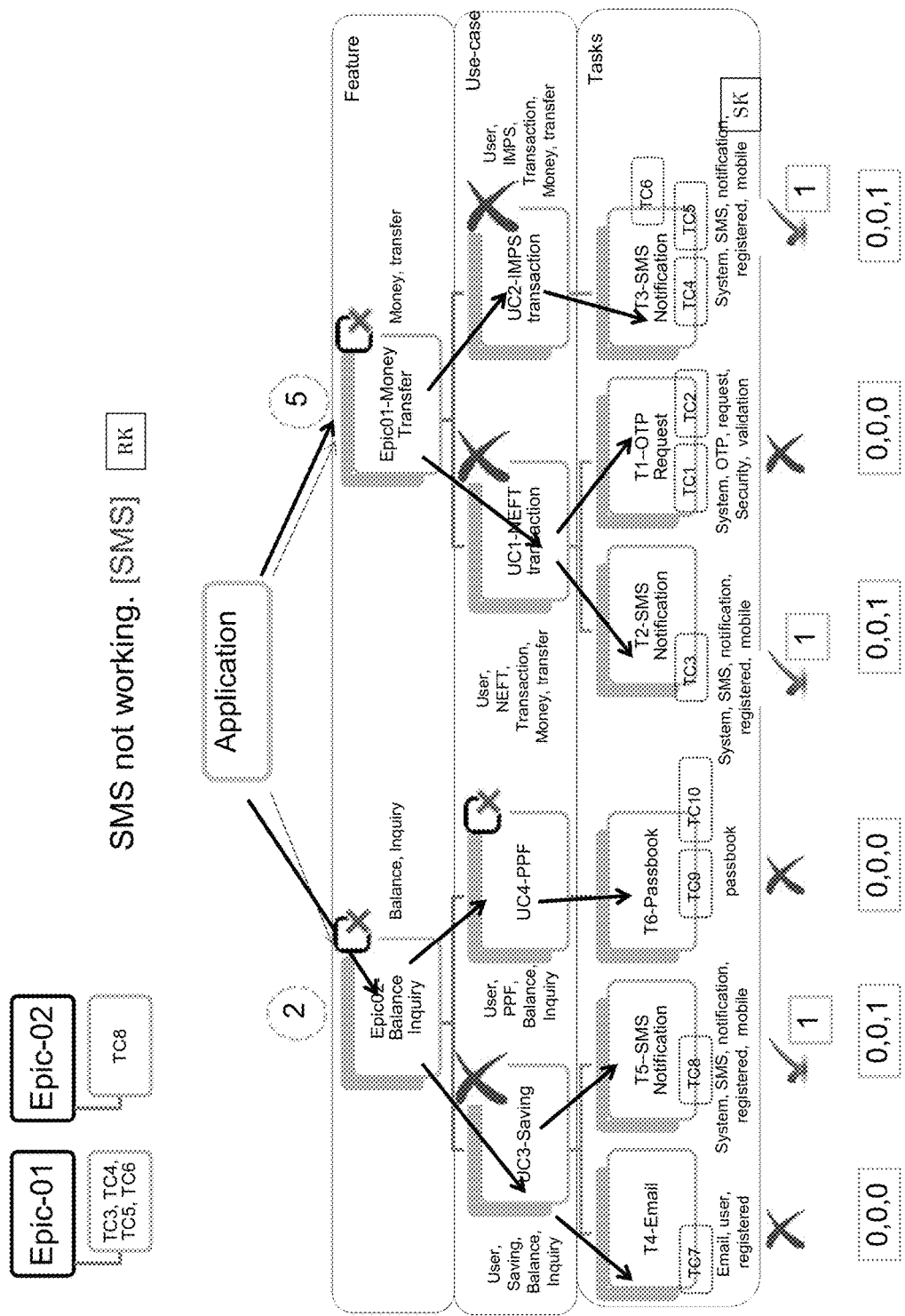
FIG. 8 illustrates a task prioritization analysis for a "SMS not working" user feedback data for the development and production data based application evolution system of FIG. 1, according to an example of the present disclosure.

FIG. 8 illustrates a task prioritization analysis for a "SMS not working" user feedback data for the system 100, according to an example of the present disclosure.

Referring to FIG. 8, with respect to the negative review of "SMS not working", for which, based on an application of natural language processing, the keyword "SMS" is identified, an analysis of FIG. 8 shows that a match with respect to the keyword SMS occurs at tasks T2, T3, and T5. Based on the matching of keyword SMS at tasks T2, T3, and T5, the use-cases UC1, UC2, and UC3 are selected. Further, because there is no keyword SMS at the use-case level, no further mapping is performed with respect to the feature level. With respect to weightage, only those tasks that include a weightage (e.g., T2, T3, and T5) may be considered for further analysis. The numbers below T2, T3, and T5 that specify "0,0,1" may be used to indicate no mapping at the feature level, no mapping at the use-case level, and a mapping at the task level. The feature priority may be specified and applied as disclosed herein with respect to FIG. 15I. For example, the feature priority for "Money Transfer" is specified as "5", and the feature priority for "Balance Inquiry" is specified as "2". Thus, based on the higher priority of the "Money Transfer" feature of "5", all the test cases for which there is a mapping associated with the "Money Transfer" feature may be considered for further analysis (e.g., TC3, TC4, TC5, and TC6). Similarly, based on the lower priority of the "Balance Inquiry" feature of "2", if one of the features is to be chosen, then the higher priority "Money Transfer" may be selected for further analysis.

Figure 9:
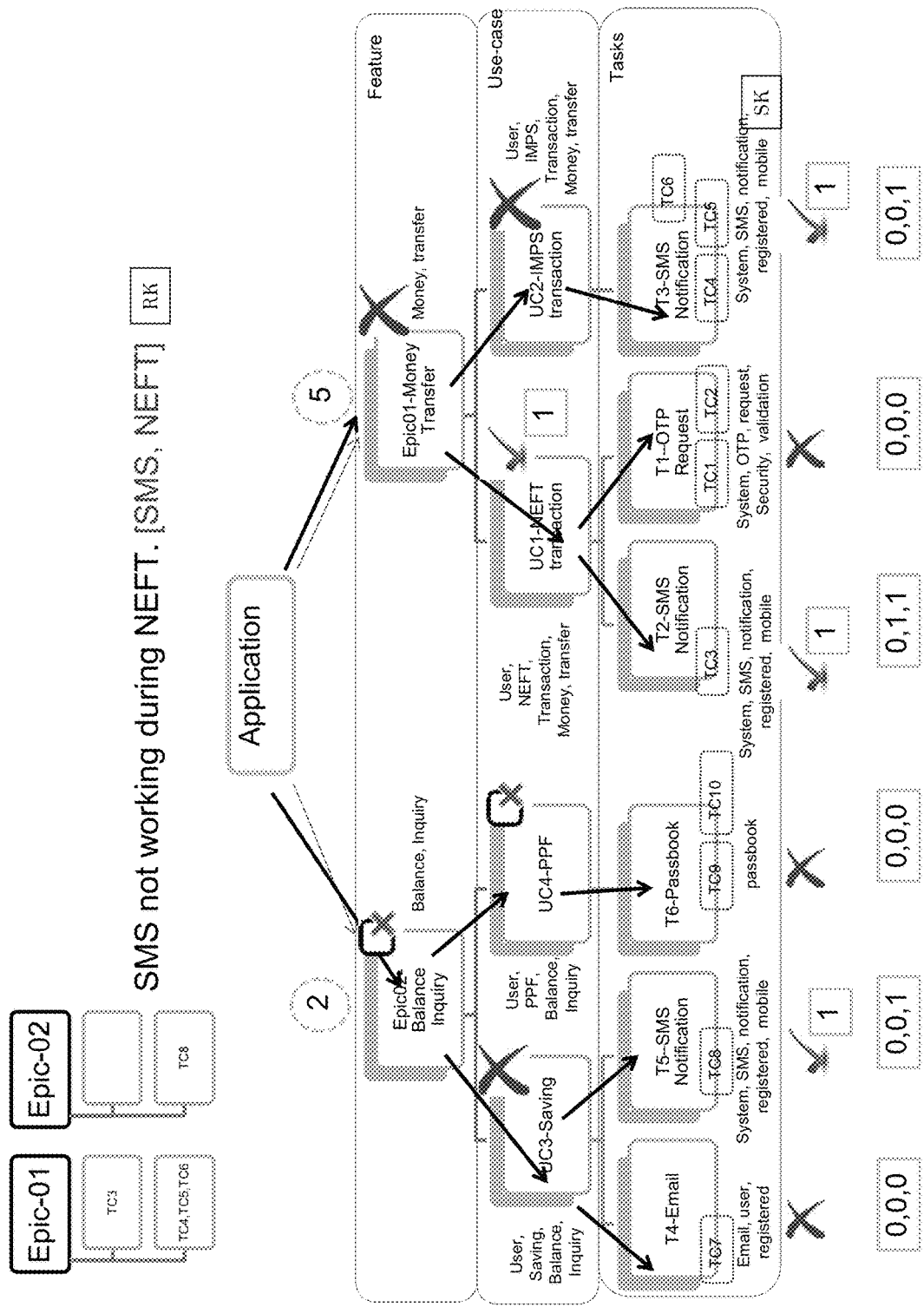
FIG. 9 illustrates a task prioritization analysis for a "SMS not working during National Electronic Funds Transfer (NEFT)" user feedback data for the development and production data based application evolution system of FIG. 1, according to an example of the present disclosure.

FIG. 9 illustrates a task prioritization analysis for a "SMS not working during NEFT" user feedback data for the system 100, according to an example of the present disclosure.

Referring to FIG. 9, compared to FIG. 8, the keyword "NEFT" may map at the use-case level (e.g., UC1). The corresponding numbers below T2 that specify "0,1,1" may be used to indicate no mapping at the feature level, a mapping at the use-case level, and a mapping at the task level. Thus, TC3 may represent the highest priority test case, followed by TC4, TC5, TC6, and TC8.

Figure 10:
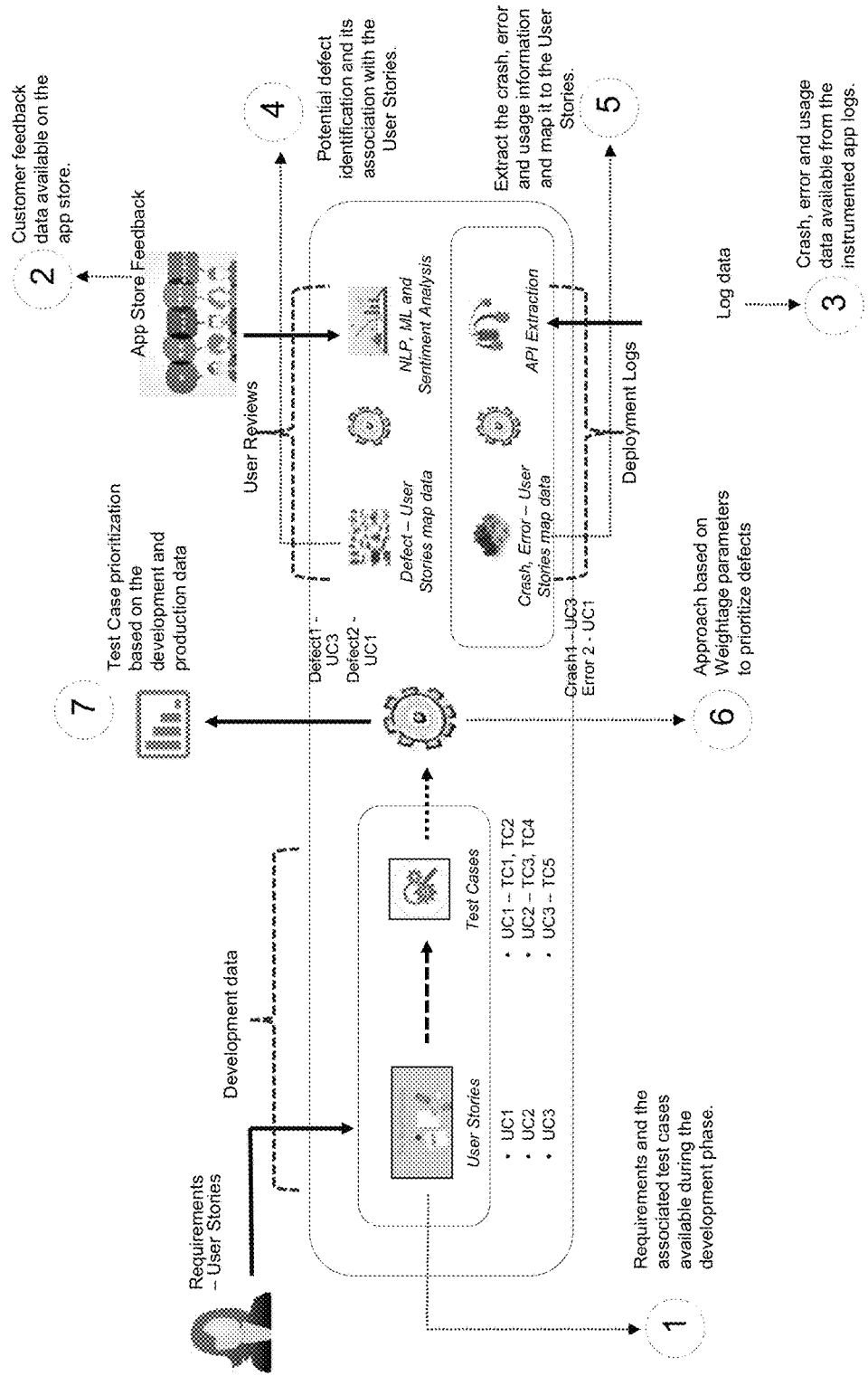
FIG. 10 illustrates task prioritization (for test case prioritization) with respect to development data and production data including user feedback data and production log data for the development and production data based application evolution system of FIG. 1, according to an example of the present disclosure.

FIG. 10 illustrates task prioritization (for test case prioritization) with respect to development data and production data including user feedback data and production log data for the system 100, according to an example of the present disclosure.

Operation of the task prioritizer 128 with respect to locations "1", "2", and "4" of FIG. 10 are disclosed above with respect to corresponding locations "1", "2", and "3" of FIG. 5.

Referring to location "3" FIG. 10, if production log data 122 is available, the release data may include crash, error and usage logs from the application 106.

Referring to location "5" FIG. 10, the task prioritizer 128 may map the crash, error, and usage logs with the task. With respect to the production data 114, if production log data 122 is available, the task prioritizer 128 may extract the crash_tuple {screenName, crash Description, count}, error_tuple {screenName, errorDescription, count}, and screen_usage_tuple {screenName, usageCount} information using, for example, REST application programming interface (API) calls, and save this information respectively into crash_vectors, error_vectors, and screen_usage_vectors. Thus, the task prioritizer 128 may extract the tuple information related to the crash, error, and usage using the REST API call from a tool which captures the production log data 122.

With respect to the production log data 122, the task prioritizer 128 may map the crash_tuple, error_tuple, and screen-usage_tuple at L3 level tasks. The screen information at the crash_tuple, error_tuple and screen_usage_tuple may be matched with the screen information present in the task_screen_vectors of the tasks. The number of matches may then be stored at each task as crash_weightage, error_weightage, and task-usage_weightage. The tuple includes the screen of the application 106, which may be used to determine the crash_weightage, error_weightage, and task-usage_weightage by using the screen associativity.

With respect to the production log data 122, the crash, error, and screen-usage may represent the other criteria available from the production logs to prioritize tests as disclosed herein with respect to determination of priority between the criteria.

With respect to location "6" in FIG. 10, for determination of priority between the criteria, the task prioritizer 128 may prioritize the tasks based on the multi-criteria availability. The task level statistics (e.g., issue_weightage, popularity_weightage, crash_weightage, error_weightage, and task-usage_weightage), and the criteria priority may be used to prioritize tasks (which have associated test cases), and hence provide a task priority index (referred as task_priority_releasedata) based on the release data. The task prioritizer 128 may apply an epic_weight (i.e., organizational priority) to the task_priority_releasedata to determine the final task priority (task_priority). The issue_weightage, popularity_weightage, crash_weightage, error_weightage, and task-usage_weightage criteria may be used to determine the task priority based on release data, and feature priority may be applied to derive the final task priority. The final task priority may be used to determine the prioritized test cases which are derived from the prioritized tasks due to its associativity.

The task prioritizer 128 may prioritize the tasks based on the priority index (i.e., task_priority) of a task. In this regard, a task may include associated test cases, which in turn may be prioritized.

Referring to location "7" of FIG. 10, the output that includes the prioritized tests for the next release of the application 106 based on current release data (i.e., the development data 112 and the production data 114) may be rendered on a user interface and/or downloaded as a test plan document.

Figure 11:
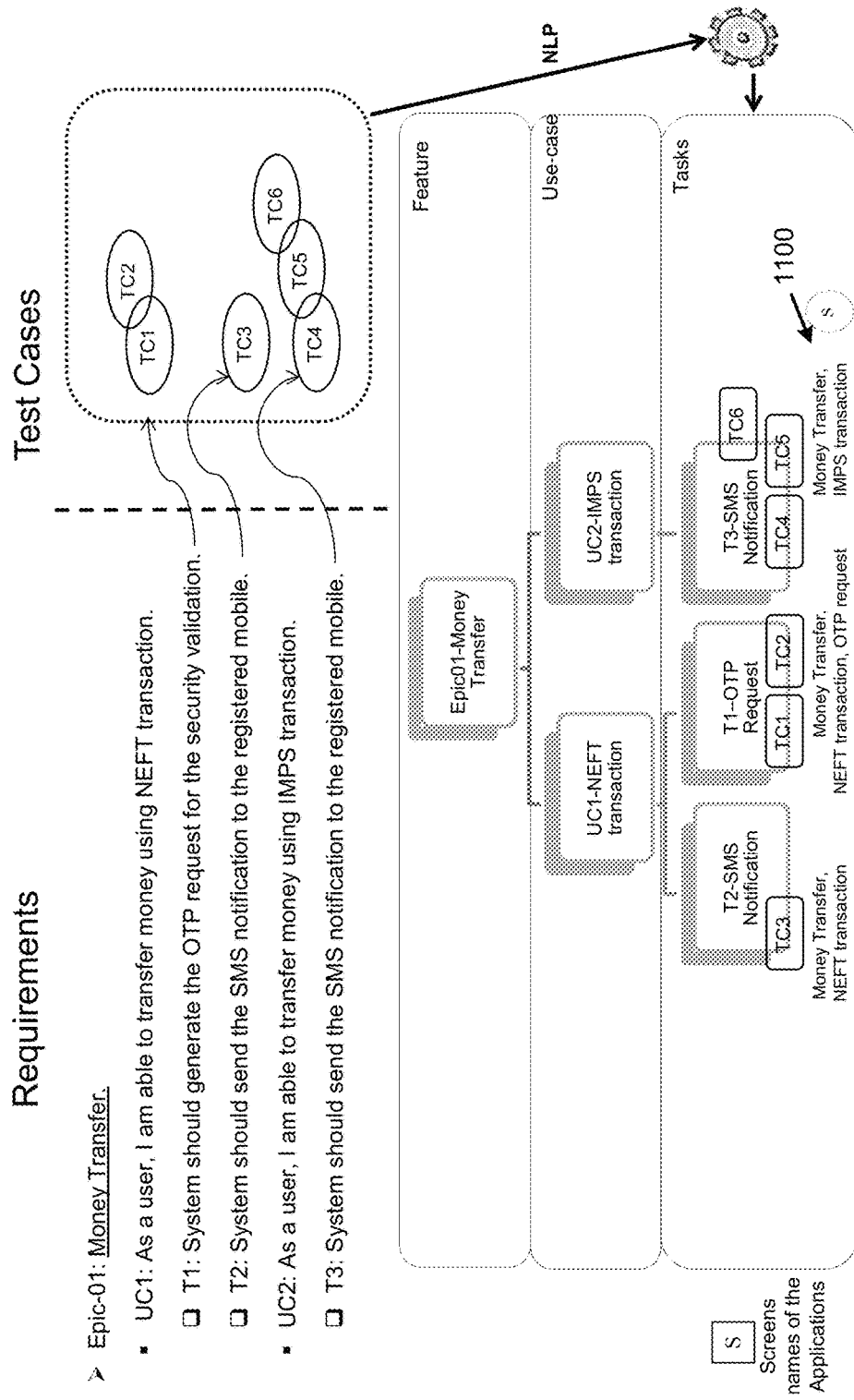
FIG. 11 illustrates requirements and test cases for a money transfer scenario with respect to development data for the development and production data based application evolution system of FIG. 1, according to an example of the present disclosure.

FIG. 11 illustrates requirements and test cases for a money transfer scenario with respect to development data for the system 100, according to an example of the present disclosure.

Referring to FIG. 11, as disclosed herein, the development data 112 may include the requirement (i.e., user stories, specified as use-case-1 (UC1), use-case-2 (UC2), etc.) and test cases (specified as TC1, TC2, etc.). For a money transfer scenario associated with the application 106, the requirements may include "Epic-01: Money Transfer", which includes use-case-1 (UC1) which specifies that "UC1: As a user, I am able to transfer money using NEFT transaction", and associated Task-1 which specifies that "T1: System should generate the OTP request for the security validation", and Task-2 which specifies that "T2: System should send the SMS notification to the registered mobile". Further, the "Epic-01: Money Transfer" may include use-case-2 (UC2) which specifies "UC2: As a user, I am able to transfer money using Immediate Payment Service (IMPS) transaction", and associated Task-3 which specifies that "T3: System should send the SMS notification to the registered mobile." As shown in FIG. 11, T1 maps to TC1 and TC2, T2 maps to TC3, and T3 maps to TC4, TC5, and TC6. As also shown in FIG. 11, the epic (i.e., feature of the application 106) forms the Level-1 (L1) of the requirement, epic may be subsequently broken down into Level-2 (L2) which represents use-cases which are further broken into more granular levels known as tasks at Level-3 (L3). As shown at 1100, the screen names of the application 106 as associated with each task are identified.

Figure 12:
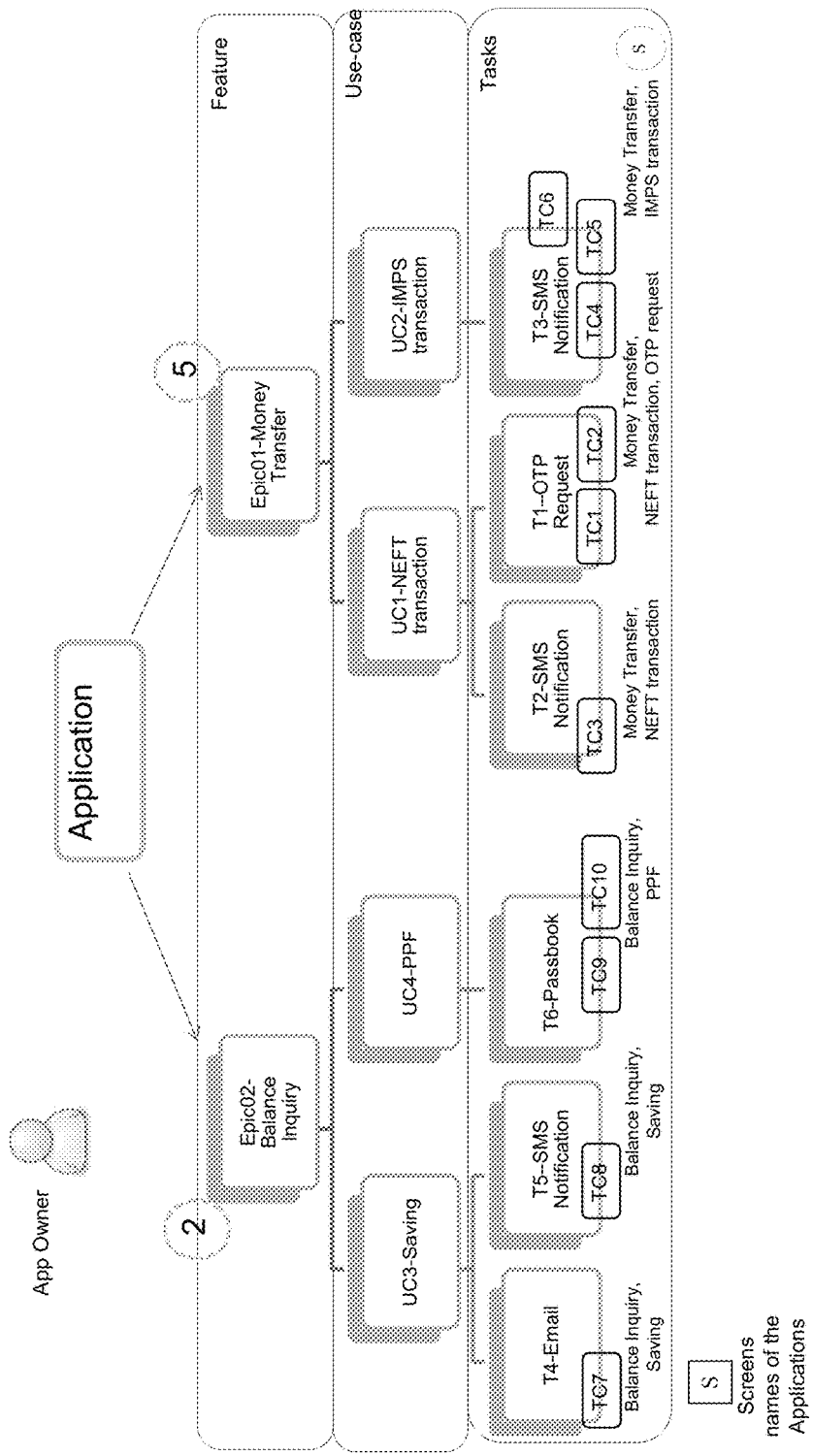
FIG. 12 illustrates a balance inquiry and a money transfer scenario with respect to development data for the development and production data based application evolution system of FIG. 1, according to an example of the present disclosure.

FIG. 12 illustrates a balance inquiry and a money transfer scenario with respect to development data for the system 100, according to an example of the present disclosure.

Similar to FIG. 11, for FIG. 12, the application 106 may include various features (e.g., money transfer, balance inquiry, etc.), where the epic (i.e., feature of the application 106) forms the Level-1 (L1) of the requirement, epic may be subsequently broken down into Level-2 (L2) which represents use-cases which are further broken into more granular levels known as tasks at Level-3 (L3).

Figure 13:
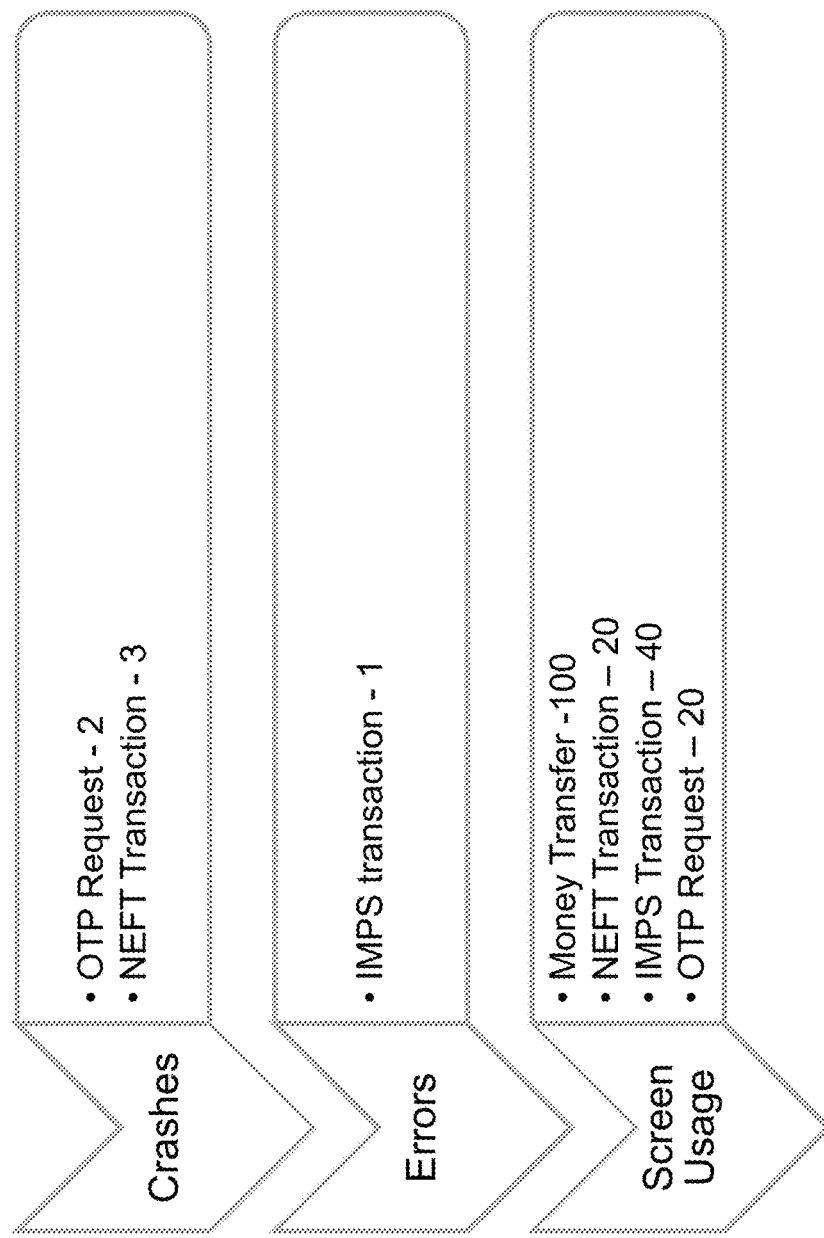
FIG. 13 illustrates production data including production log data including crashes, errors, and screen usage for the development and production data based application evolution system of FIG. 1, according to an example of the present disclosure.

FIG. 13 illustrates production data including production log data including crash, error, and screen usage for the system 100, according to an example of the present disclosure.

Referring to FIG. 13, examples of production log data including crashes may include one-time password (OTP) requests screen (2 crashes), NEFT transactions screen (3 crashes), etc., examples of errors may include IMPS transactions screen (1 error), etc., and examples of screen usage may include money transfer screen (100 usages), NEFT transaction screen (20 usages), etc.

Figure 14:
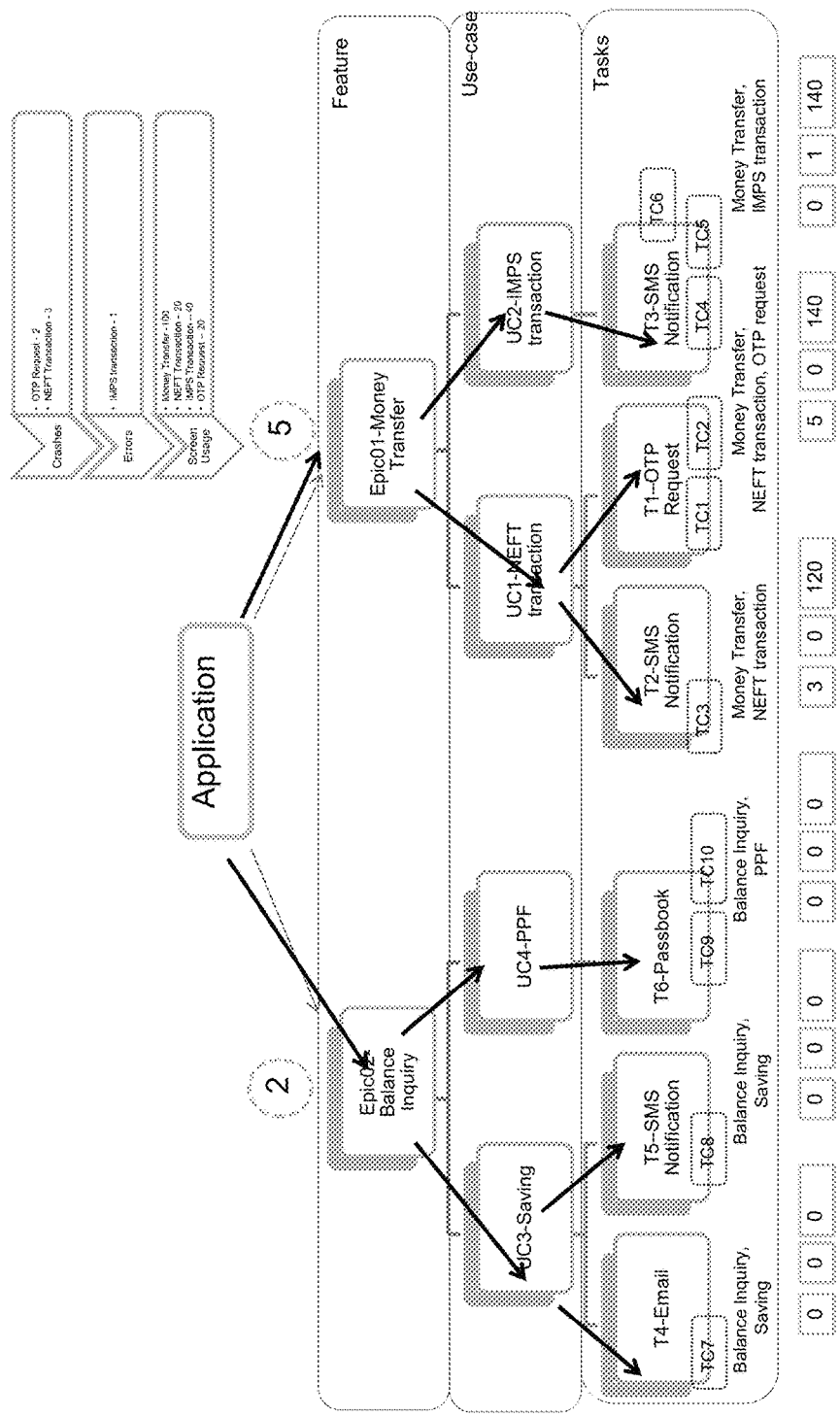
FIG. 14 illustrates a balance inquiry and a money transfer scenario with respect to crash, error, and screen-usage weightages for the development and production data based application evolution system of FIG. 1, according to an example of the present disclosure.

FIG. 14 illustrates a balance inquiry and a money transfer scenario with respect to crash, error, and screen-usage weightages for the system 100, according to an example of the present disclosure.

Referring to FIG. 14, with respect to the production log data 122, the screens of the application 106 which are used to implement a particular task may be identified. That is, the production log data 122 may represent the crashes at a particular screen level, the errors at a particular screen level, etc., for the application 106. For the example of FIG. 14, the crash_weightage, error_weightage, and task-usage_weightage criteria may be used to determine the task_priority_releasedata for each task.

FIGS. 15A-15J illustrate details of a task prioritization model for the system 100, according to an example of the present disclosure.

The task prioritizer 128 may determine priority on a wide range of alternatives with respect to a set of criteria 126 to achieve a goal 108. With respect to priority determination, multiple criteria 126 may be weighted based on the relative importance of a criterion compared to other criteria, and the 'intensity' of that importance. The task prioritizer 128 may determine the relative importance of a type of data (e.g., crashes vs. user sentiments) for different application strategies/goals (e.g., a release prioritizes performance over new features) using a crowd (e.g., large number of internal project managers, external subject matter experts (SMEs)) based approach. The task prioritizer 128 may prioritize the data in the domain on test recommendations from post-release data analytics. The task prioritizer 128 may provide for the determination of a sense of how an organization views the relative importance of post release data for determining test case priorities for test cases 132 associated with the tasks 120.

Figure 15A:
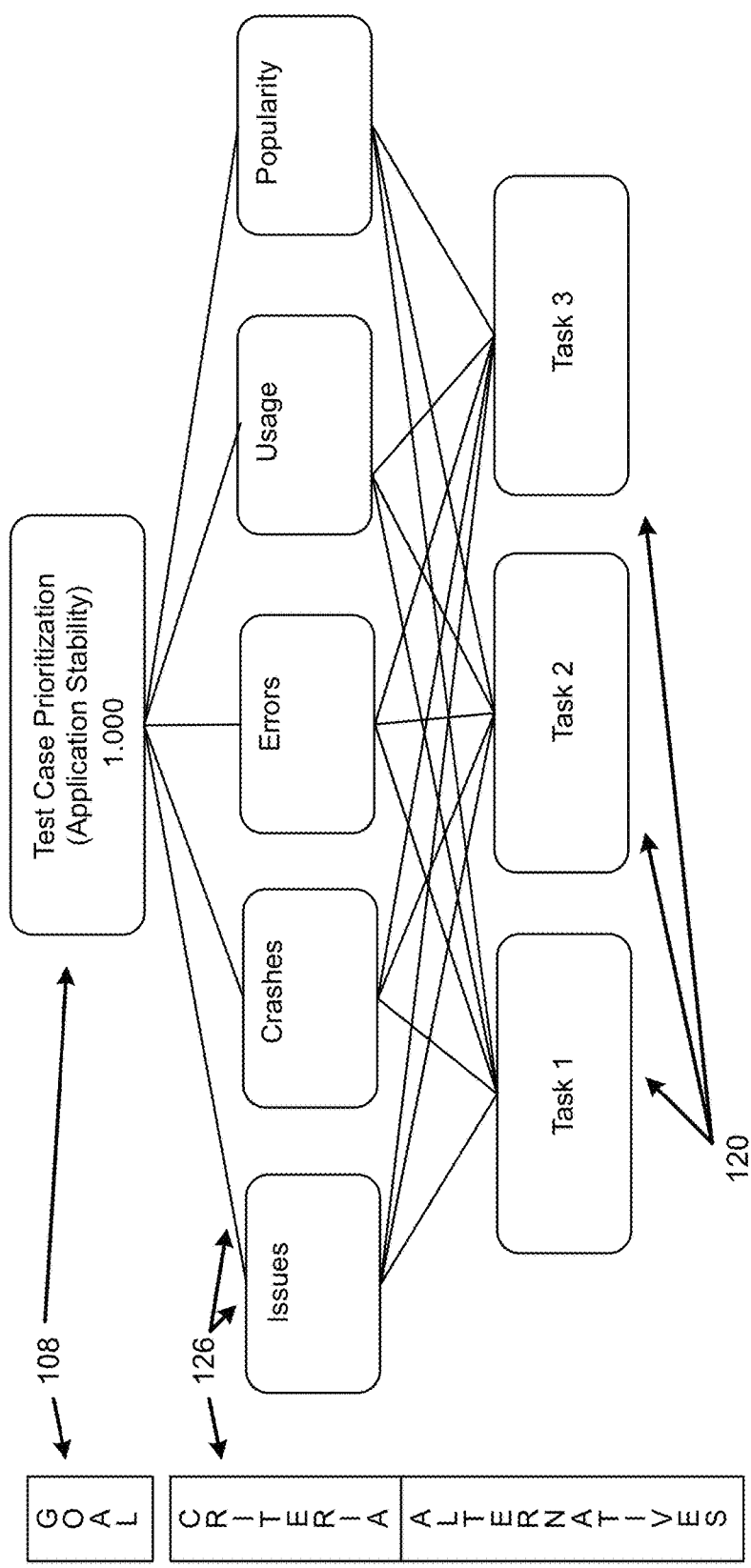
FIGS. 15A-15J illustrate details of a task prioritization model for the development and production data based application evolution system of FIG. 1, according to an example of the present disclosure.

Referring to FIG. 15A, the task prioritizer 128 may be configured to determine task prioritization using an application strategy such as application stability. In this regard, the "goal" 108 may be specified as "application stability", the criteria 126 may include the "issues", "crashes", "errors", "usage", and "popularity", and the alternatives may include the set of tasks for the application 106 (e.g., Task-1, Task-2, Task-3, etc.). The "crashes", "errors", and "usage" may be obtained from the production log data 122, and the "issues" and "popularity" may be obtained from the user feedback data 124. The task prioritizer 128 may determine which task from Task-1, Task-2, and Task-3 is best suited to achieve the "goal" specified as "application stability". The tasks 120 may be mapped to test cases as disclosed herein with respect to FIGS. 6 and 11. Additional criteria and/or alternatives may be added during the determination of task priority. The priority of the goal is 1.000 (or a specified value), the priorities of the alternatives add to 1.000 (or the specified value), and for one level of criteria, the priorities add to 1.000 (or the specified value).

Figure 15B:
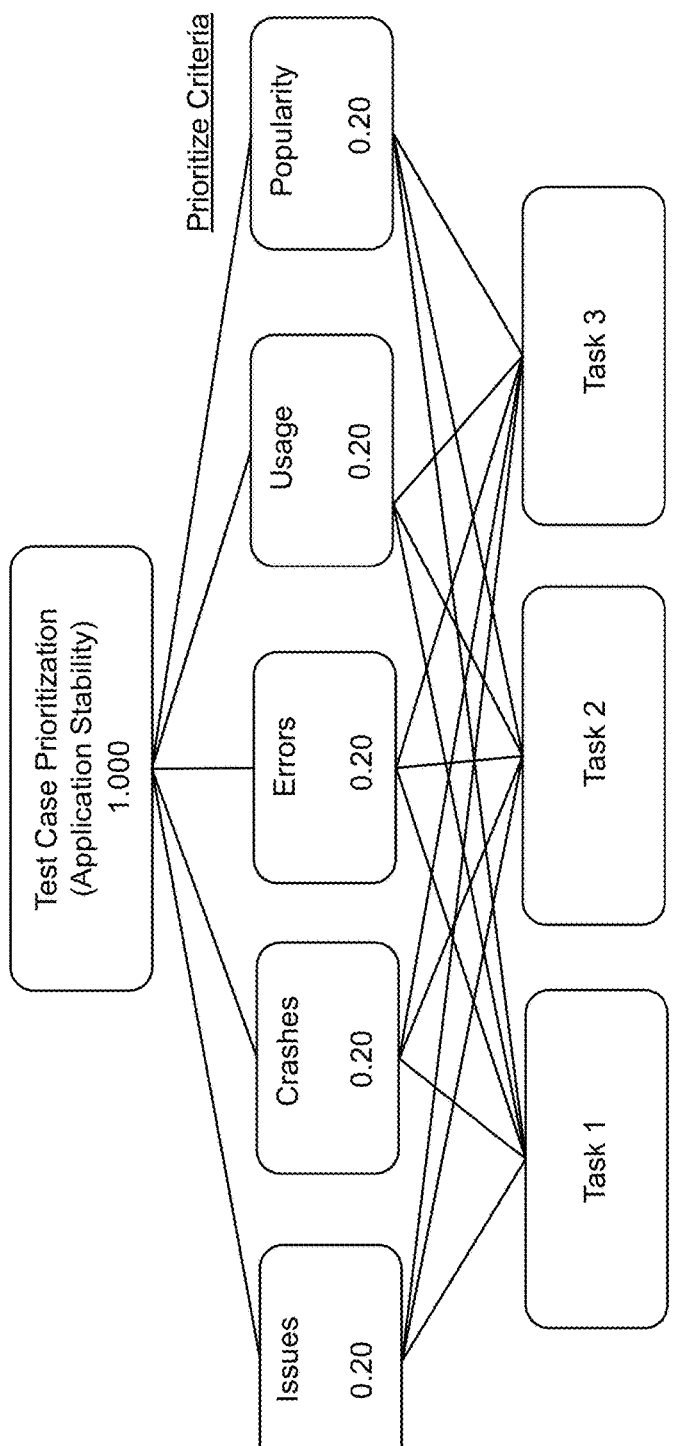

Referring to FIG. 15B, with respect to criteria prioritization, default weights may be assigned to the criteria 126. For example, the criteria 126 including "issues", "crashes", "errors", "usage", and "popularity" may each be assigned a default weight of 0.20.

Figure 15C:
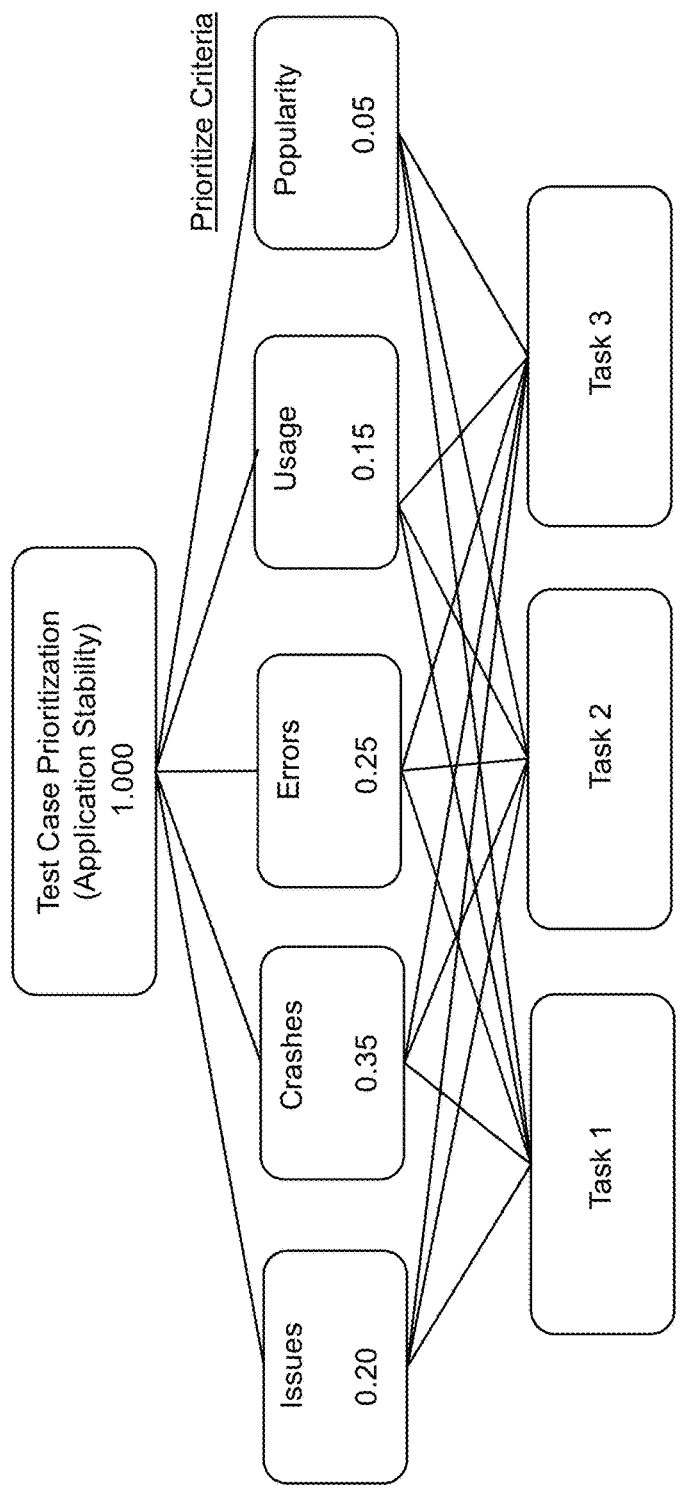

Referring to FIG. 15C, with respect to criteria prioritization, the default weights assigned to the criteria may be modified by a SME and/or modified based on the particulars of a project (e.g., history of a high or low number of "crashes", etc.). For example, the criteria 126 including "issues", "crashes", "errors", "usage", and "popularity" may be respectively assigned weights of 0.20, 0.35, 0.25, 0.15, and 0.05.

Figure 15D:
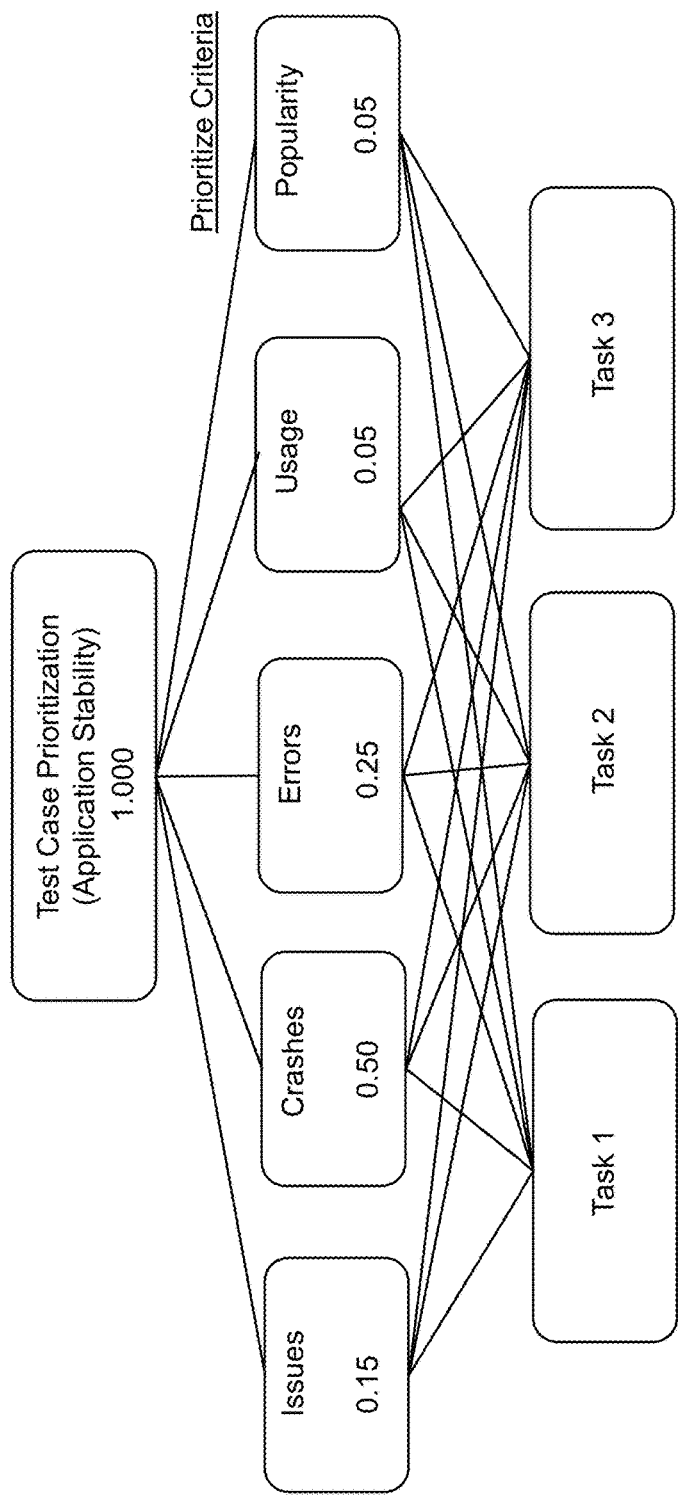

Referring to FIG. 15D, with respect to criteria prioritization, the default weights assigned to the criteria 126 may be modified based, for example, on crowd sourcing of weights using a pairwise comparison. For example, subject matter experts may be queried to ascertain weights for the different criteria 126, and further, the subject matter experts may be queried to ascertain which criterion of a pair of criteria is of higher priority. Based on the crowd sourcing of the weights using pairwise comparison, the criteria 126 including "issues", "crashes", "errors", "usage", and "popularity" may be respectively assigned weights of 0.15, 0.50, 0.25, 0.05, and 0.05.

Figure 15E:
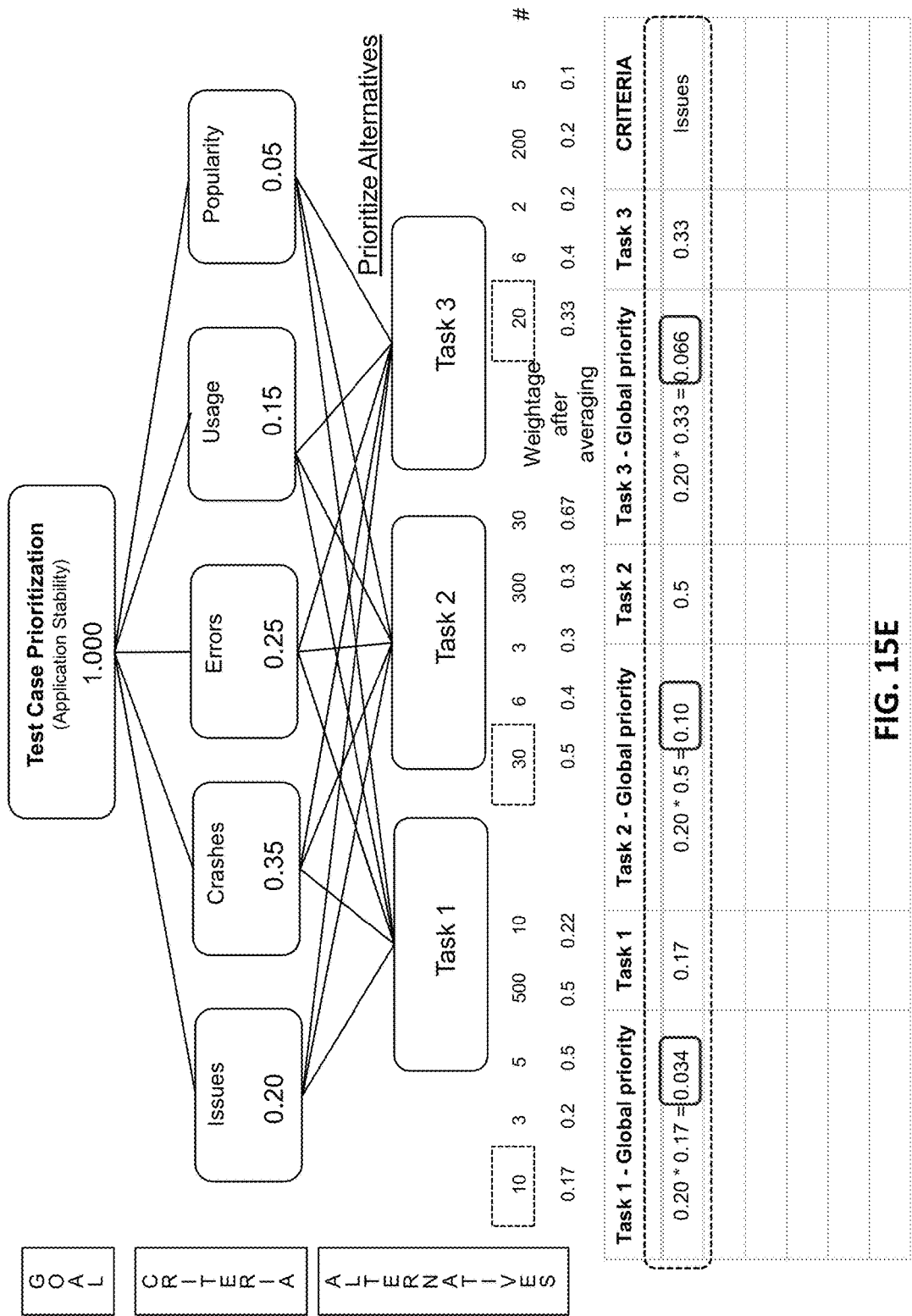
Figure 15F:
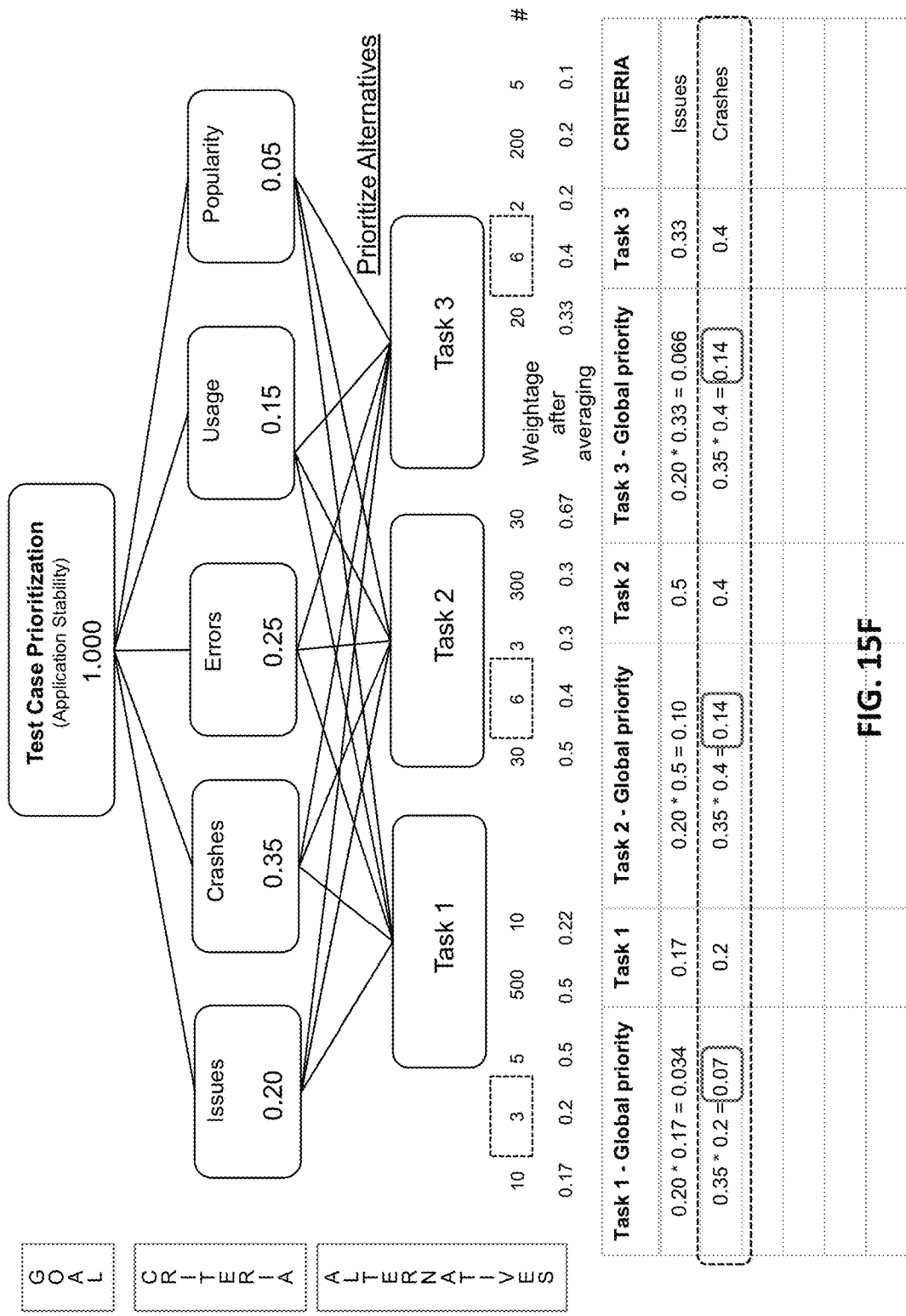
Figure 15G:
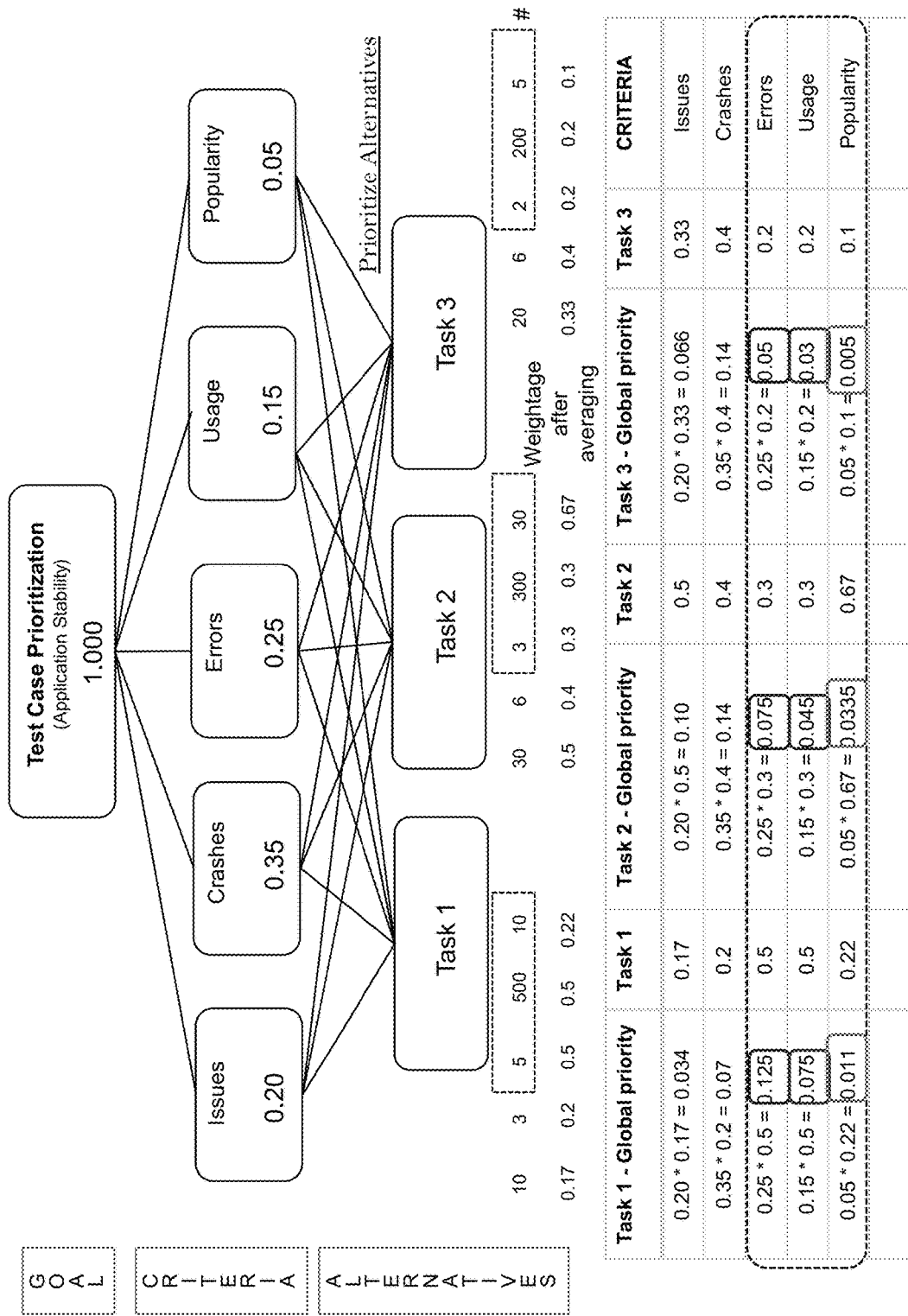
Figure 15H:
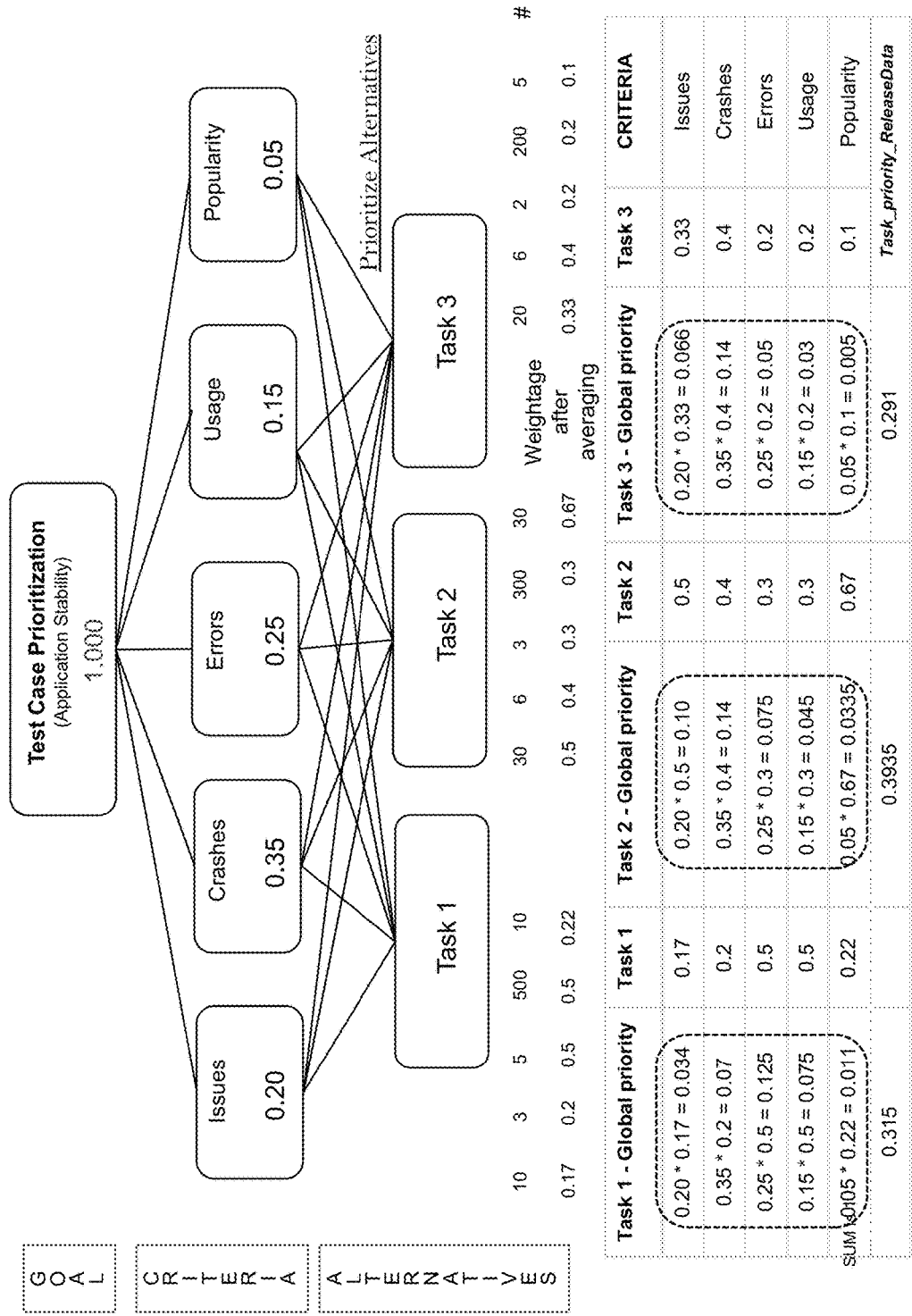

Referring to FIG. 15E, the global priority for each of the tasks 120 may be determined as a function of weightage after averaging. For example, a Task-1 global sub-priority with respect to "issues" may be determined by determining a total number of "issues" for each of the tasks (e.g., "issues" for Task 1=10, "issues" for Task 2=30, "issues" for Task 3=20, and total number of "issues" for each of the tasks=10+30+20=60), dividing a number of "issues" for a task by the total number of "issues" for each of the tasks (e.g., 10/60=0.17, etc.), and multiplying the weight assigned to the "issues" criterion by the Task-1 global sub-priority with respect to "issues" (e.g., 0.20×0.17=0.034). The value determined by dividing the number of "issues" for a task by the total number of "issues" for each of the tasks (e.g., 10/60=0.17) may represent the weightage after averaging. Further, referring to FIGS. 15F to F5H, the Task-1 global priority with respect to all of the criteria 126 may be determined by summing the Task-1 global sub-priorities for each of the criteria (e.g., 0.034+0.07+0.125+0.075+0.011=0.315). Referring to FIGS. 15E to F5H, in a similar manner, the Task-2 and Task-3 global priority with respect to all of the criteria 126 may be determined. Referring to FIG. 15H, the Task-1, Task-2, and Task-3 global priority may represent the task_priority_releasedata, where the total of the Task-1, Task-2, and Task-3 global priority is equal to 1.000 (or approximately 1.000 based on rounding error).

Figure 15I:
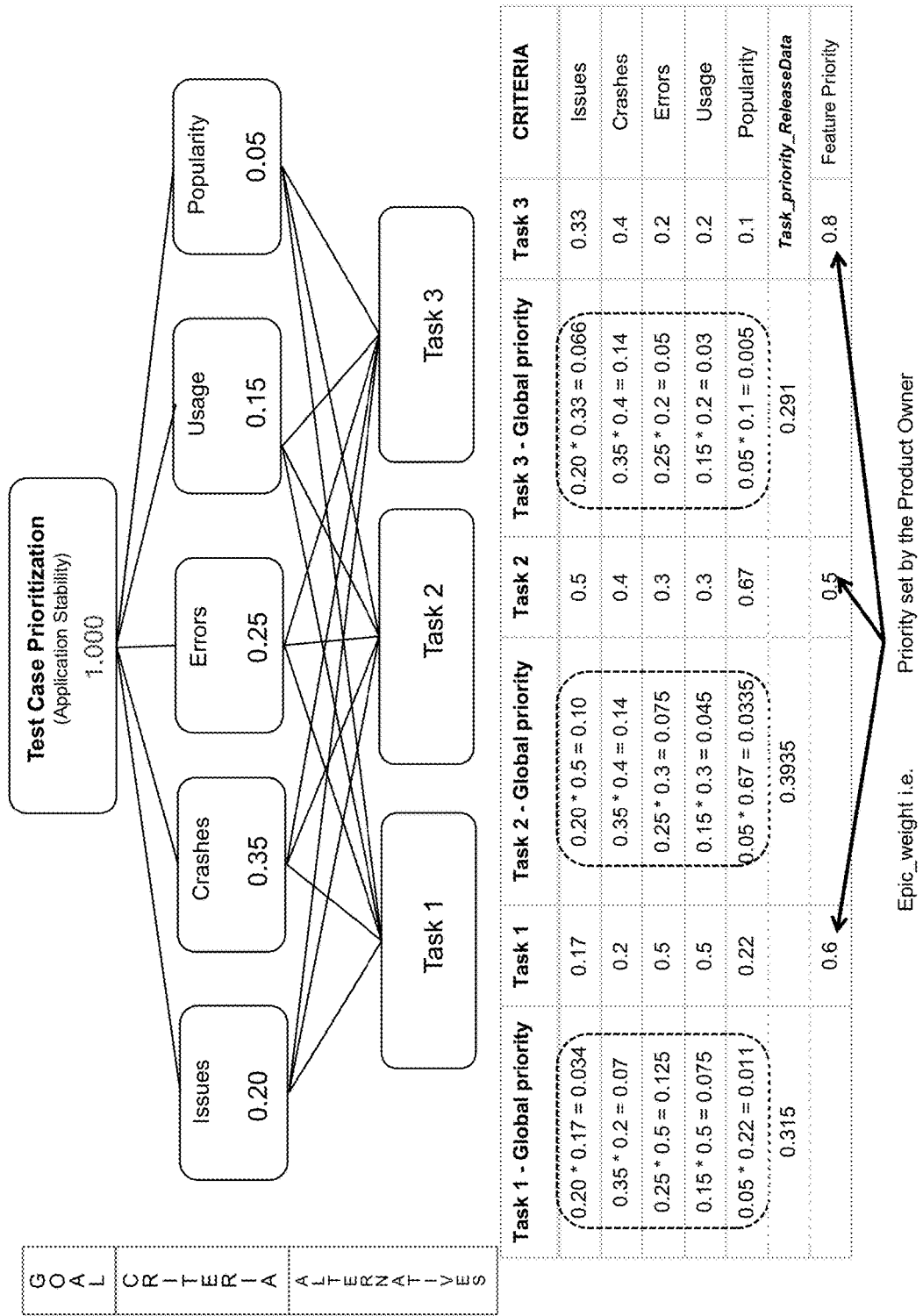

Referring to FIG. 15I, the task prioritizer 128 may apply an epic_weight (i.e., organizational priority) to the task_priority_releasedata to determine the final task priority (task_priority). The epic_weight may represent a priority set, for example, by a user such as a product owner. Each of the tasks may be associated with a same feature or different features as disclosed herein with reference to FIGS. 6 and 11. For example, Task-1 may be associated with a Feature-1, Task-2 may be associated with a Feature-2, etc.

Figure 15J:
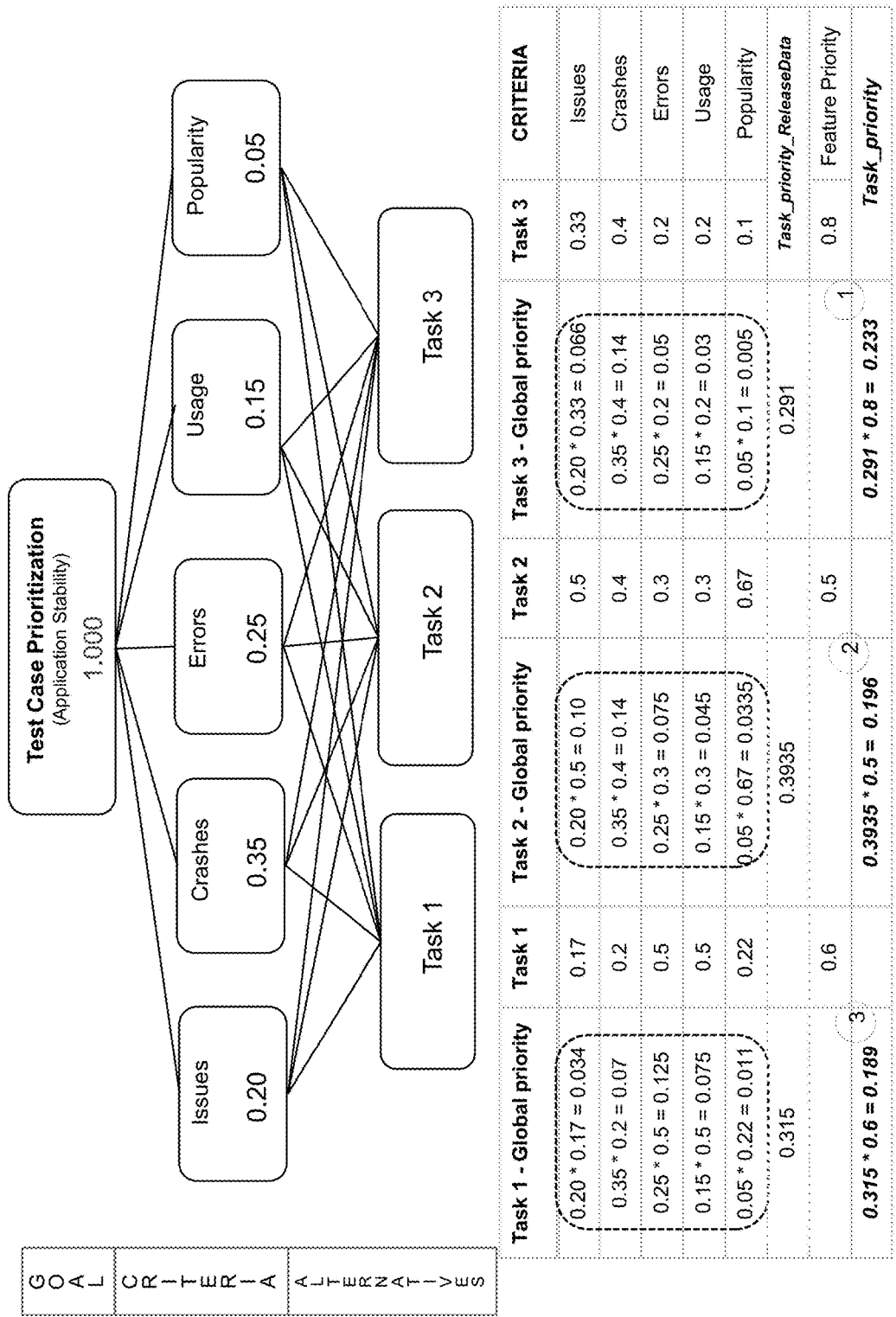

Referring to FIG. 15J, the task prioritizer 128 may apply the epic_weight to the task_priority_releasedata to determine the final task priority (task_priority). For example, the final priority for Task-1 is 0.189, the final priority for Task-2 is 0.196, and the final priority for Task-3 is 0.233. Thus, referring to FIGS. 6, 11, and 15J, Task-3 and its associated test cases (e.g., TC4, TC5, and TC6 for the example of FIGS. 6 and 11) may represent the highest priority test cases that are to be applied to next release (e.g., release (n+1) for the example of FIG. 3) of the application 106. In a similar manner, Task-2 and Task-1 may respectively represent the next levels for test cases that are to be applied to next release of the application 106.

Figure 16:
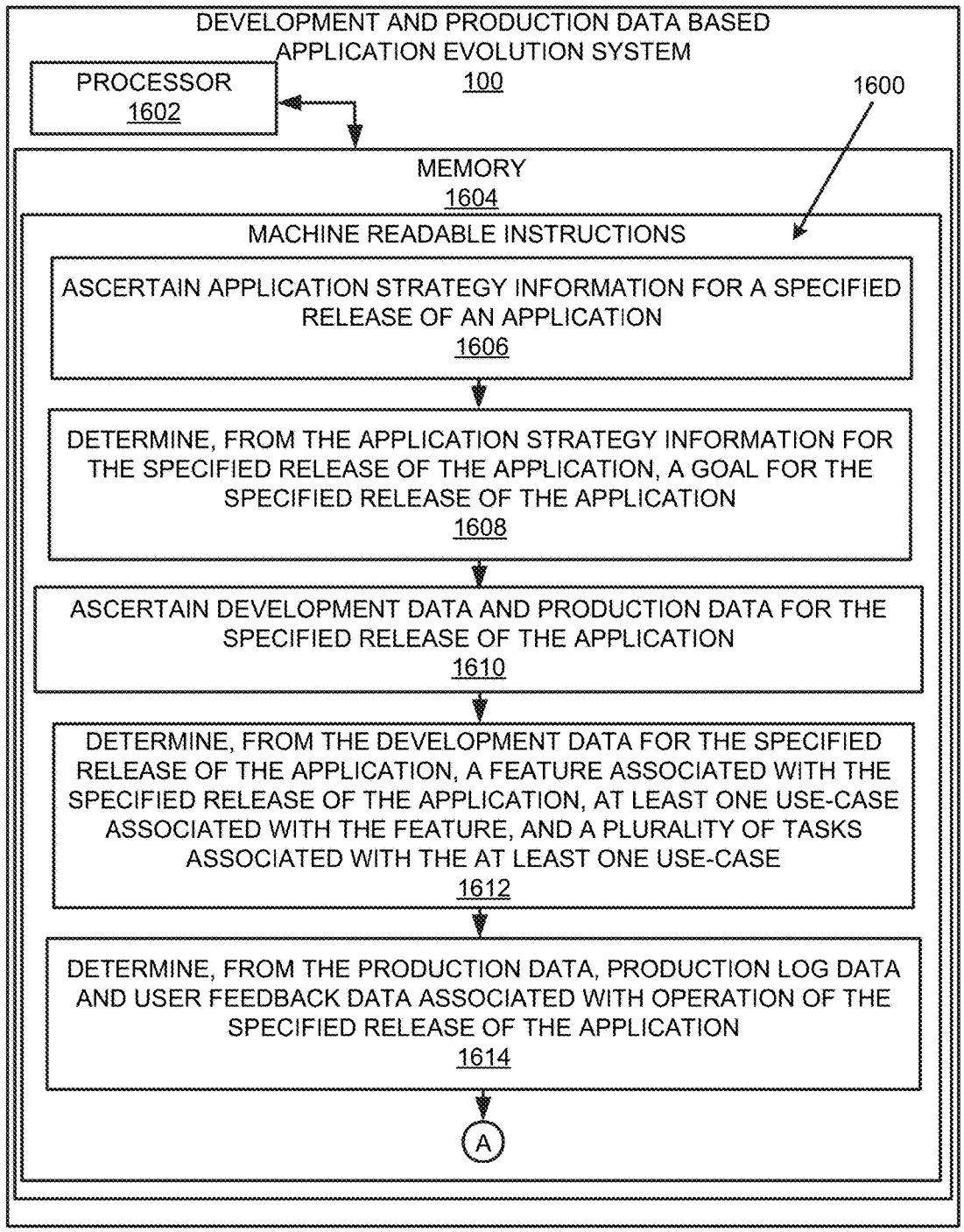
FIG. 16 illustrates a flowchart of a method for development and production data based application evolution, according to an example of the present disclosure.
Figure 16:
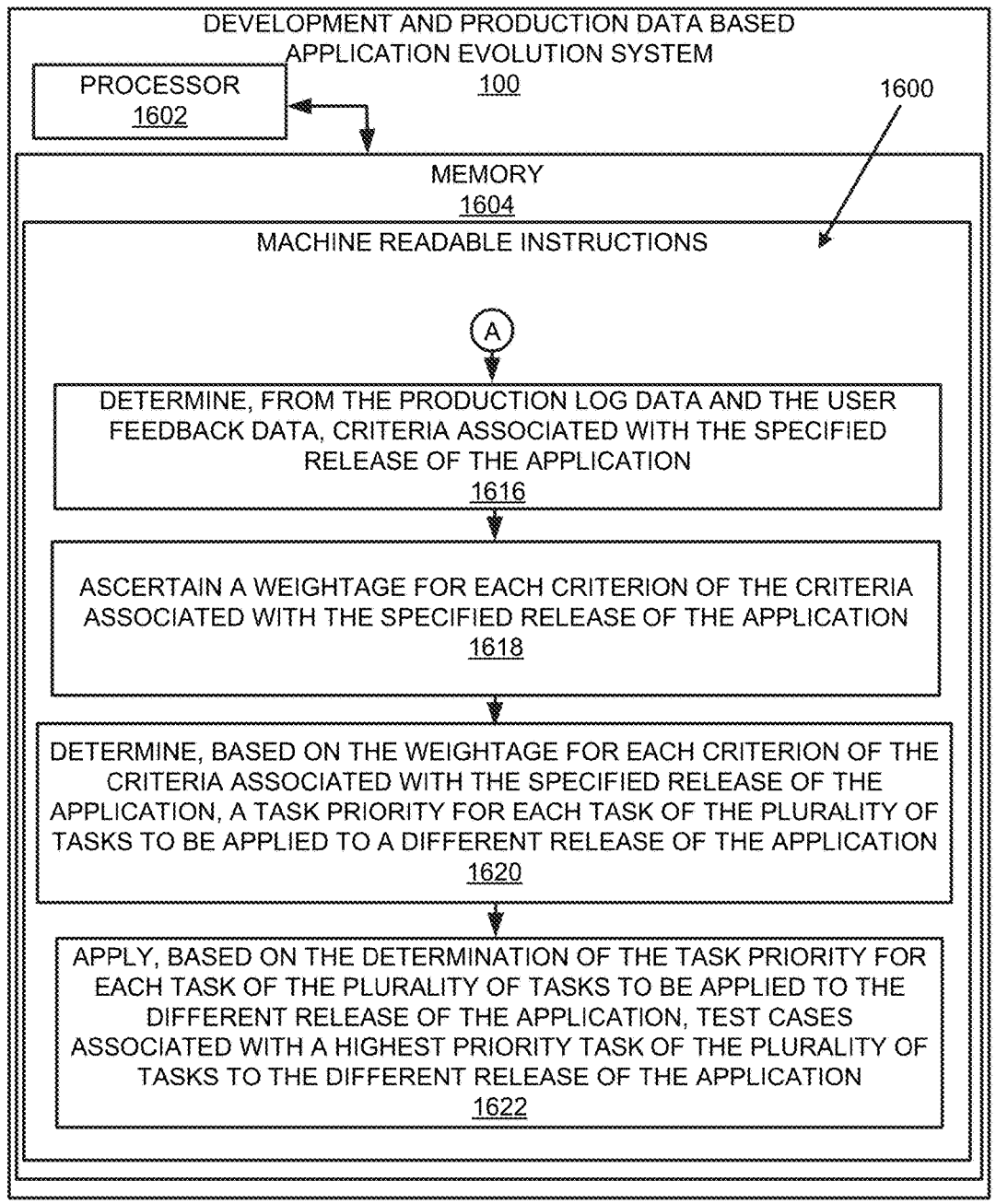
Figure 17:
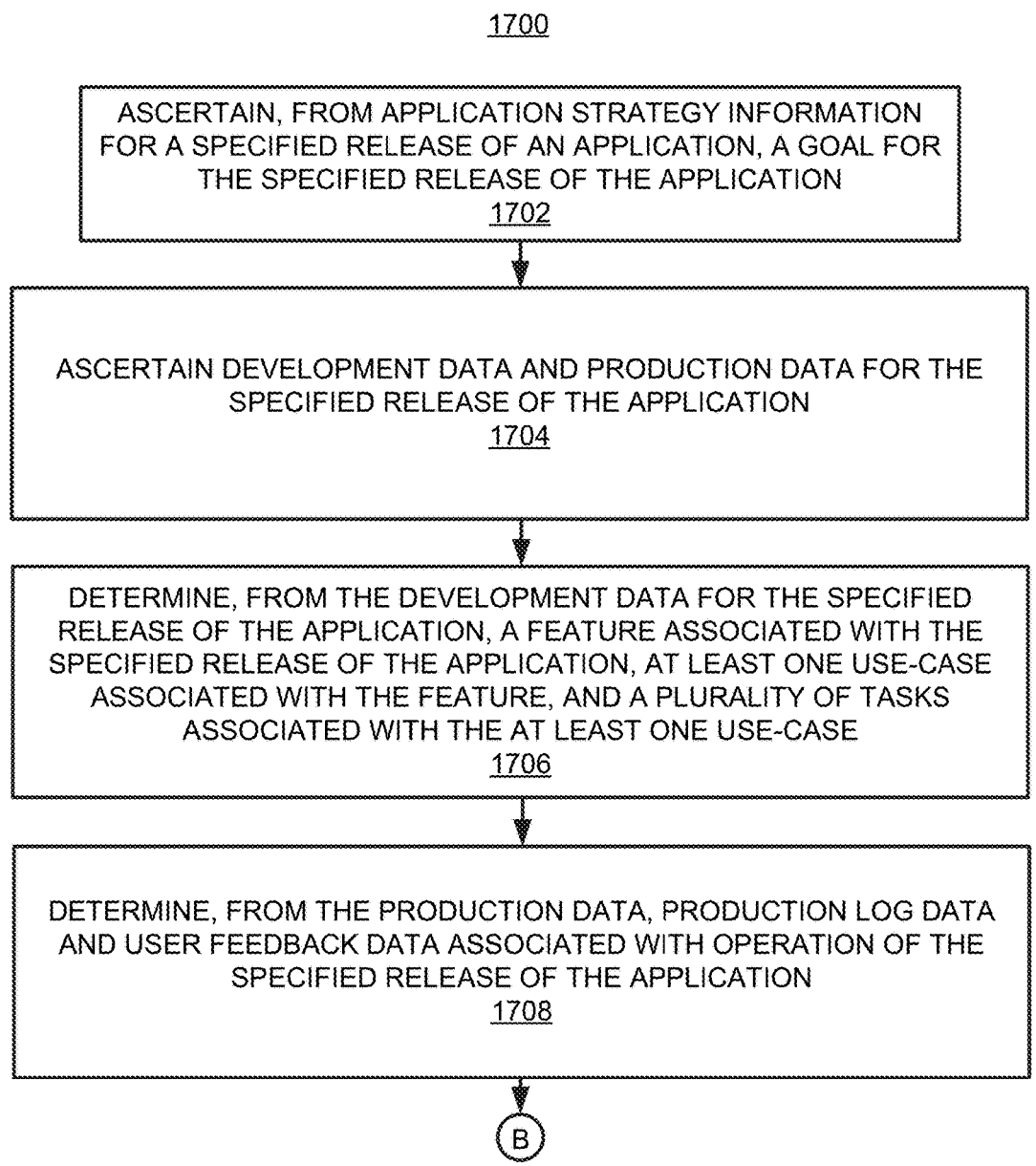
FIG. 17 illustrates a flowchart of another method for development and production data based application evolution, according to an example of the present disclosure.
Figure 17:
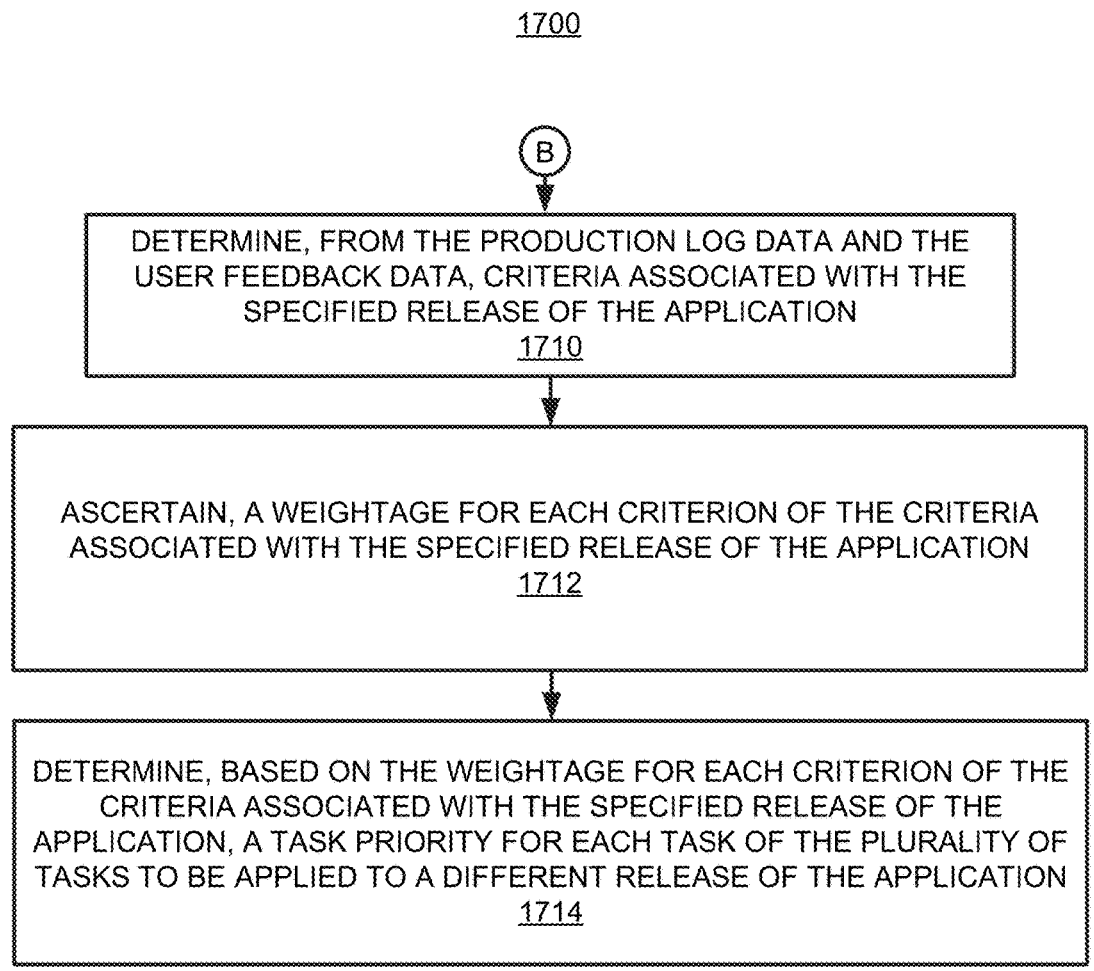
Figure 18:
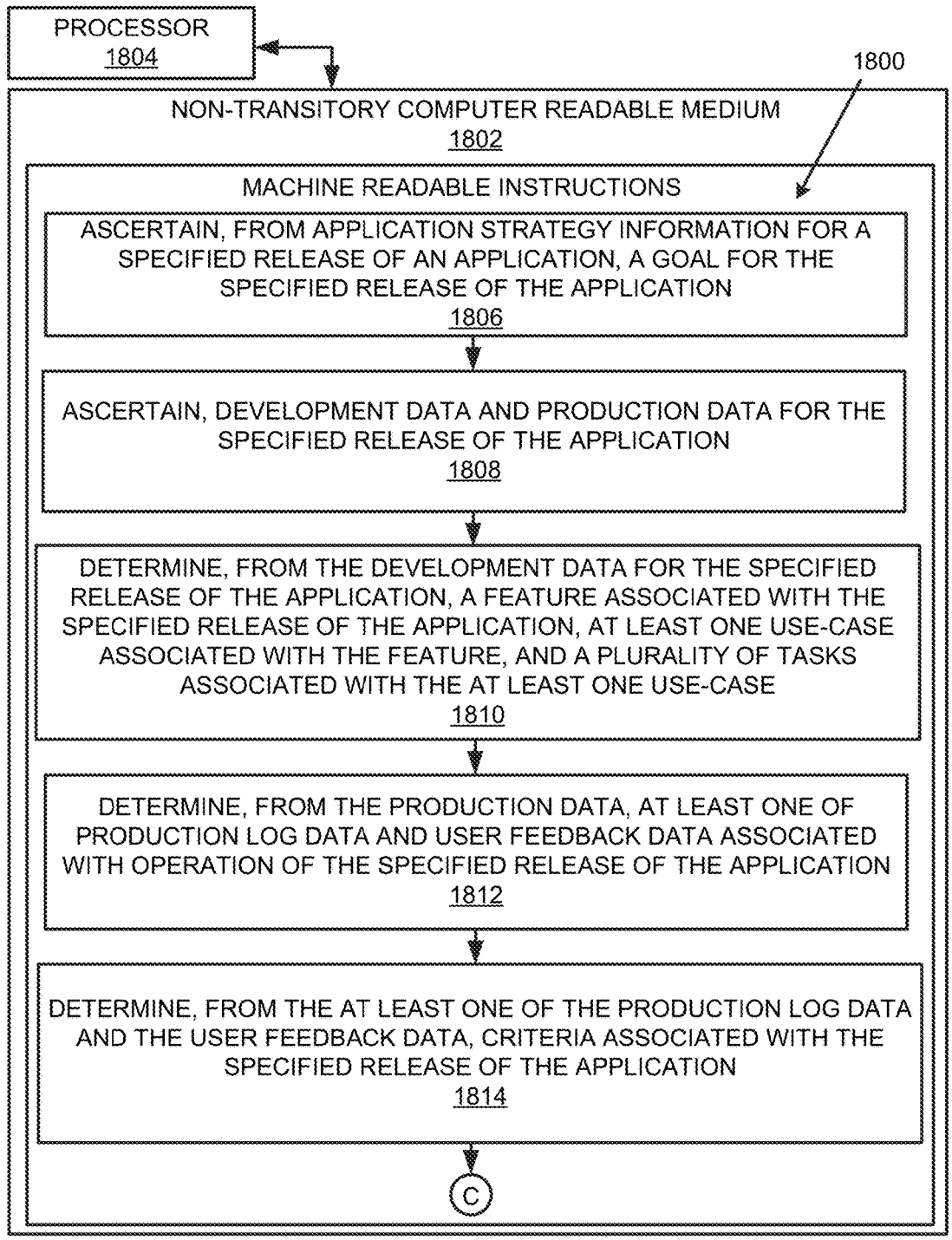
FIG. 18 illustrates a flowchart of a further method for development and production data based application evolution, according to an example of the present disclosure.
Figure 18:
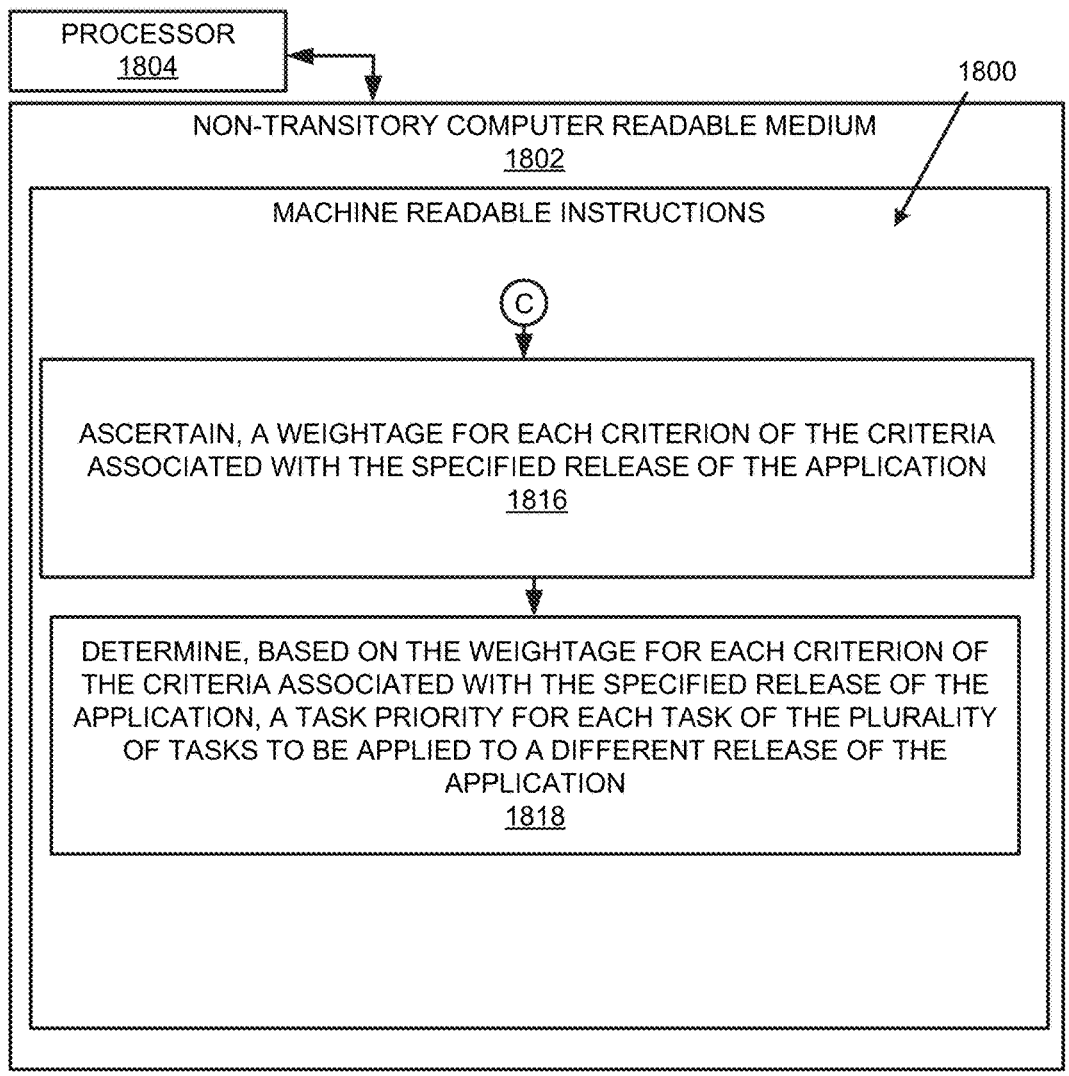

FIGS. 16-18 respectively illustrate flowcharts of methods 1600, 1700, and 1800 for development and production data based application evolution, according to examples. The methods 1600, 1700, and 1800 may be implemented on the system 100 described above with reference to FIGS. 1-15J by way of example and not limitation. The methods 1600, 1700, and 1800 may be practiced in other system. In addition to showing the method 1600, FIG. 16 shows hardware of the system 100 that may execute the method 1600. The hardware may include a processor 1602, and a memory 1604 storing machine readable instructions that when executed by the processor cause the processor to perform the steps of the method 1600. The memory 1604 may represent a non-transitory computer readable medium. FIG. 17 may represent a method for development and production data based application evolution, and the steps of the method. FIG. 18 may represent a non-transitory computer readable medium 1802 having stored thereon machine readable instructions to provide development and production data based application evolution. The machine readable instructions, when executed, cause a processor 1804 to perform steps of the method 1800 also shown in FIG. 18.

The processor 1602 of FIG. 16 and/or the processor 1804 of FIG. 18 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1802 of FIG. 18), such as hardware storage devices (e.g., RAM (random access memory), ROM (read only memory), EPROM (erasable, programmable ROM), EEPROM (electrically erasable, programmable ROM), hard drives, and flash memory). The memory 1604 may include a RAM, where the machine readable instructions and data for a processor may reside during runtime.

Referring to FIGS. 1-16, and particularly to the method 1600 shown in FIG. 16, at block 1606, the method 1600 may include ascertaining (e.g., by the application goal generator 102) application strategy information 104 for a specified release (e.g., release-n) of the application 106.

At block 1608, the method 1600 may include determining (e.g., by the application goal generator 102), from the application strategy information 104 for the specified release of the application 106, the goal 108 for the specified release of the application 106.

At block 1610, the method 1600 may include ascertaining (e.g., by the development data and production data analyzer 110) development data 112 and production data 114 for the specified release of the application 106.

At block 1612, the method 1600 may include determining (e.g., by the development data and production data analyzer 110), from the development data 112 for the specified release of the application 106, the feature 116 associated with the specified release of the application 106, at least one use-case 118 associated with the feature 116, and the plurality of tasks 120 associated with the at least one use-case 118.

At block 1614, the method 1600 may include determining (e.g., by the development data and production data analyzer 110), from the production data 114, production log data 122 and user feedback data 124 associated with operation of the specified release of the application 106.

At block 1616, the method 1600 may include determining (e.g., by the development data and production data analyzer 110), from the production log data 122 and the user feedback data 124, criteria 126 associated with the specified release of the application 106.

At block 1618, the method 1600 may include ascertaining (e.g., by the task prioritizer 128) the weightage 130 for each criterion of the criteria 126 associated with the specified release of the application 106.

At block 1620, the method 1600 may include determining (e.g., by the task prioritizer 128), based on the weightage 130 for each criterion of the criteria 126 associated with the specified release of the application 106, a task priority for each task of the plurality of tasks 120 to be applied to a different release (e.g., release (n+1)) of the application 106.

At block 1622, the method 1600 may include applying (e.g., by the task prioritizer 128), based on the determination of the task priority for each task of the plurality of tasks 120 to be applied to the different release of the application 106, test cases 132 associated with a highest priority task of the plurality of tasks 120 to the different release of the application 106.

Referring to FIGS. 1-15J and 17, and particularly FIG. 17, for the method 1700, at block 1702, the method may include ascertaining (e.g., by the application goal generator 102), from application strategy information for a specified release of the application 106, the goal 108 for the specified release of the application 106.

At block 1704, the method 1700 may include ascertaining (e.g., by the development data and production data analyzer 110) development data 112 and production data 114 for the specified release of the application 106.

At block 1706, the method 1700 may include determining (e.g., by the development data and production data analyzer 110) from the development data 112 for the specified release of the application 106, the feature 116 associated with the specified release of the application, at least one use-case 118 associated with the feature 116, and the plurality of tasks 120 associated with the at least one use-case 118.

At block 1708, the method 1700 may include determining (e.g., by the development data and production data analyzer 110) from the production data 114, production log data 122 and user feedback data 124 associated with operation of the specified release of the application 106.

At block 1710, the method 1700 may include determining (e.g., by the development data and production data analyzer 110) from the production log data 122 and the user feedback data 124, criteria 126 associated with the specified release of the application 106.

At block 1712, the method 1700 may include ascertaining (e.g., by the task prioritizer 128) the weightage 130 for each criterion of the criteria 126 associated with the specified release of the application 106.

At block 1714, the method 1700 may include determining (e.g., by the task prioritizer 128) based on the weightage 130 for each criterion of the criteria 126 associated with the specified release of the application 106, a task priority for each task of the plurality of tasks 120 to be applied to a different release of the application 106.

Referring to FIGS. 1-15J and 18, and particularly FIG. 18, for the method 1800, at block 1806, the method may include ascertaining (e.g., by the application goal generator 102), from application strategy information for a specified release of an application 106, the goal 108 for the specified release of the application 106.

At block 1808, the method 1800 may include ascertaining (e.g., by the development data and production data analyzer 110), development data 112 and production data 114 for the specified release of the application 106.

At block 1810, the method 1800 may include determining (e.g., by the development data and production data analyzer 110), from the development data 112 for the specified release of the application 106, a feature 116 associated with the specified release of the application 106, at least one use-case 118 associated with the feature, and a plurality of tasks 120 associated with the at least one use-case 118.

At block 1812, the method 1800 may include determining (e.g., by the development data and production data analyzer 110), from the production data 114, production log data 122 and/or user feedback data 124 associated with operation of the specified release of the application 106.

At block 1814, the method 1800 may include determining (e.g., by the development data and production data analyzer 110), from the production log data 122 and/or the user feedback data 124, criteria 126 associated with the specified release of the application 106.

At block 1816, the method 1800 may include ascertaining (e.g., by the task prioritizer 128), the weightage 130 for each criterion of the criteria 126 associated with the specified release of the application 106.

At block 1818, the method 1800 may include determining (e.g., by the task prioritizer 128), based on the weightage 130 for each criterion of the criteria 126 associated with the specified release of the application 106, a task priority for each task of the plurality of tasks 120 to be applied to a different release of the application 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A development and production data based application evolution system comprising:
   a processor; and
   a memory storing machine readable instructions that when executed by the processor cause the processor to:
   ascertain application strategy information for a specified release of an application;
   determine, from the application strategy information for the specified release of the application, a goal for the specified release of the application;
   ascertain development data and production data for the specified release of the application;
   determine, from the development data for the specified release of the application,
      a feature associated with the specified release of the application,
      at least one use-case associated with the feature, and
      a plurality of tasks associated with the at least one use-case;
   determine, from the production data, production log data and user feedback data associated with operation of the specified release of the application, wherein the user feedback data includes at least one of issues associated with the specified release of the application or popularity associated with the specified release of the application;
   determine, from the production log data and the user feedback data, criteria associated with the specified release of the application;
   ascertain a weightage for each criterion of the criteria associated with the specified release of the application;
   determine, based on the weightage for each criterion of the criteria associated with the specified release of the application, a task priority for each task of the plurality of tasks to be applied to a different release of the application by determining, for each task of the plurality of tasks, a number of occurrences of a criterion associated with the user feedback data by
      performing a natural language processing analysis on the user feedback data,
      identifying, based on the performing of the natural language processing analysis on the user feedback data, at least one keyword,
      identifying a mapping of the at least one keyword to each task of the plurality of tasks, each use-case of the at least one use-case, and the feature,
      for each identified mapping of the at least one keyword, increasing a weightage associated with each corresponding task of the plurality of tasks,
      identifying a task of the plurality of tasks including a highest weightage, and
      incrementing, for the identified task of the plurality of tasks including the highest weightage, the number of occurrences of the criterion associated with the user feedback data; and
   apply, based on the determination of the task priority for each task of the plurality of tasks to be applied to the different release of the application, test cases associated with a highest priority task of the plurality of tasks to the different release of the application.

2. The development and production data based application evolution system according to claim 1, wherein
   the production log data includes at least one of crashes associated with a particular display for the specified release of the application, errors associated with the particular display for the specified release of the application, or usage of the particular display for the specified release of the application.

3. The development and production data based application evolution system according to claim 1, wherein the machine readable instructions to determine, based on the weightage for each criterion of the criteria associated with the specified release of the application, the task priority for each task of the plurality of tasks to be applied to the different release of the application further comprise machine readable instructions to cause the processor to:
   determine, for each task of the plurality of tasks, the number of occurrences of the criterion associated with the user feedback data by
      performing the natural language processing analysis on the user feedback data,
      identifying, based on the performing of the natural language processing analysis on the user feedback data, at least one keyword,
      identifying the mapping of the at least one keyword to each task of the plurality of tasks, each use-case of the at least one use-case, and the feature,
      for each identified mapping of the at least one keyword, increasing the weightage associated with each corresponding task of the plurality of tasks,
      determining, whether a task of the plurality of tasks includes the highest weightage,
      in response to a determination that no task of the plurality of tasks includes the highest weightage, identifying tasks of the plurality of tasks that include a same highest weightage, and
      incrementing, for the identified tasks of the plurality of tasks that include the same highest weightage, the number of occurrences of the criterion associated with the user feedback data.

4. The development and production data based application evolution system according to claim 1, wherein the machine readable instructions to determine, based on the weightage for each criterion of the criteria associated with the specified release of the application, the task priority for each task of the plurality of tasks to be applied to the different release of the application further comprise machine readable instructions to cause the processor to:

determine, for each task of the plurality of tasks, the number of occurrences of the criterion associated with the production log data by
identifying displays associated with the specified release of the application,
identifying, for each display of the displays associated with the specified release of the application, at least one criterion of the criteria,
identifying a mapping of each display of the displays associated with the specified release of the application and the at least one criterion of the criteria to each task of the plurality of tasks,
for each identified mapping, increasing the weightage associated with each corresponding task of the plurality of tasks,
identifying the task of the plurality of tasks including the highest weightage, and
incrementing, for the identified task of the plurality of tasks including the highest weightage, the number of occurrences of the criterion associated with the production log data.

5. The development and production data based application evolution system according to claim 1, wherein the machine readable instructions to determine, based on the weightage for each criterion of the criteria associated with the specified release of the application, the task priority for each task of the plurality of tasks to be applied to the different release of the application further comprise machine readable instructions to cause the processor to:
determine, for each task of the plurality of tasks, the number of occurrences of the criterion associated with the production log data by
identifying displays associated with the specified release of the application,
identifying, for each display of the displays associated with the specified release of the application, at least one criterion of the criteria,
identifying a mapping of each display of the displays associated with the specified release of the application and the at least one criterion of the criteria to each task of the plurality of tasks,
for each identified mapping, increasing the weightage associated with each corresponding task of the plurality of tasks,
determining, whether a task of the plurality of tasks includes the highest weightage,
in response to a determination that no task of the plurality of tasks includes the highest weightage, identifying tasks of the plurality of tasks that include a same highest weightage, and
incrementing, for the identified tasks of the plurality of tasks that include the same highest weightage, the number of occurrences of the criterion associated with the production log data.

6. The development and production data based application evolution system according to claim 1, wherein the machine readable instructions to determine, based on the weightage for each criterion of the criteria associated with the specified release of the application, the task priority for each task of the plurality of tasks to be applied to the different release of the application further comprise machine readable instructions to cause the processor to:
determine, for each task of the plurality of tasks, the number of occurrences of each criterion of the criteria respectively associated with the production log data or the user feedback data;
determine, for each criterion of the criteria, an averaging-based weightage value by dividing the number of occurrences of a criterion for a task by a total number of occurrences of the criterion for the plurality of the tasks; and
determine a global priority of each task by
determining, for each criterion of the criteria, a product of the weightage ascertained for a respective criterion and the averaging-based weightage value for the respective criterion, and
determining a total of each of the products for each criterion of the criteria.

7. The development and production data based application evolution system according to claim 6, wherein the machine readable instructions to determine, based on the weightage for each criterion of the criteria associated with the specified release of the application, the task priority for each task of the plurality of tasks to be applied to the different release of the application further comprise machine readable instructions to cause the processor to:
ascertain, for each task of the plurality of tasks, a feature priority; and
determine, for each task of the plurality of tasks, the task priority by determining a product of the global priority of a corresponding task and the feature priority of the corresponding task.

8. The development and production data based application evolution system according to claim 1, further comprising machine readable instructions to cause the processor to:
apply, based on the determination of the task priority for each task of the plurality of tasks to be applied to the different release of the application, further test cases associated with remaining tasks of the plurality of tasks in order of the task priority to the different release of the application.

9. The development and production data based application evolution system according to claim 1, wherein the machine readable instructions to ascertain the weightage for each criterion of the criteria associated with the specified release of the application further comprise machine readable instructions to cause the processor to:
ascertain the weightage for each criterion of the criteria associated with the specified release of the application based on
crowd sourcing of weights associated with the specified release of the application, and
implementing a pairwise comparison of each of the criterion.

10. A method for development and production data based application evolution, the method comprising:
ascertaining, by at least one hardware processor, from application strategy information for a specified release of an application, a goal for the specified release of the application;
ascertaining, by the at least one hardware processor, development data and production data for the specified release of the application;
determining, by the at least one hardware processor, from the development data for the specified release of the application,
a feature associated with the specified release of the application,
at least one use-case associated with the feature, and
a plurality of tasks associated with the at least one use-case;

determining, by the at least one hardware processor, from the production data, production log data and user feedback data associated with operation of the specified release of the application, wherein the user feedback data includes at least one of issues associated with the specified release of the application or popularity associated with the specified release of the application;

determining, by the at least one hardware processor, from the production log data and the user feedback data, criteria associated with the specified release of the application;

ascertaining, by the at least one hardware processor, a weightage for each criterion of the criteria associated with the specified release of the application; and determining, by the at least one hardware processor, based on the weightage for each criterion of the criteria associated with the specified release of the application, a task priority for each task of the plurality of tasks to be applied to a different release of the application by determining, for each task of the plurality of tasks, a number of occurrences of a criterion associated with the production log data by
identifying displays associated with the specified release of the application,
identifying, for each display of the displays associated with the specified release of the application, at least one criterion of the criteria,
identifying a mapping of each display of the displays associated with the specified release of the application and the at least one criterion of the criteria to each task of the plurality of tasks,
for each identified mapping, increasing a weightage associated with each corresponding task of the plurality of tasks,
identifying a task of the plurality of tasks including a highest weightage, and
incrementing, for the identified task of the plurality of tasks including the highest weightage, the number of occurrences of the criterion associated with the production log data.

11. The method according to claim 10, further comprising:
applying, by the at least one hardware processor, based on the determination of the task priority for each task of the plurality of tasks to be applied to the different release of the application, test cases associated with a highest priority task of the plurality of tasks to the different release of the application.

12. The method according to claim 11, further comprising:
applying, by the at least one hardware processor, based on the determination of the task priority for each task of the plurality of tasks to be applied to the different release of the application, further test cases associated with remaining tasks of the plurality of tasks in order of the task priority to the different release of the application.

13. The method according to claim 10, wherein ascertaining, by the at least one hardware processor, the weightage for each criterion of the criteria associated with the specified release of the application further comprises:
ascertaining, by the at least one hardware processor, the weightage for each criterion of the criteria associated with the specified release of the application based on crowd sourcing of weights associated with the specified release of the application, and
implementing a pairwise comparison of each of the criterion.

14. The method according to claim 10, wherein determining, based on the weightage for each criterion of the criteria associated with the specified release of the application, the task priority for each task of the plurality of tasks to be applied to the different release of the application further comprises:
determining, by the at least one hardware processor, for each task of the plurality of tasks, the number of occurrences of the criterion associated with the user feedback data by
performing a natural language processing analysis on the user feedback data,
identifying, based on the performing of the natural language processing analysis on the user feedback data, at least one keyword,
identifying a mapping of the at least one keyword to each task of the plurality of tasks, each use-case of the at least one use-case, and the feature,
for each identified mapping of the at least one keyword, increasing the weightage associated with each corresponding task of the plurality of tasks,
identifying the task of the plurality of tasks including the highest weightage, and
incrementing, for the identified task of the plurality of tasks including the highest weightage, the number of occurrences of the criterion associated with the user feedback data.

15. A non-transitory computer readable medium having stored thereon machine readable instructions to provide development and production data based application evolution, the machine readable instructions, when executed, cause a processor to:
ascertain, from application strategy information for a specified release of an application, a goal for the specified release of the application;
ascertain, development data and production data for the specified release of the application;
determine, from the development data for the specified release of the application,
a feature associated with the specified release of the application,
at least one use-case associated with the feature, and
a plurality of tasks associated with the at least one use-case;
determine, from the production data, at least one of production log data or user feedback data associated with operation of the specified release of the application;
determine, from the at least one of the production log data or the user feedback data, criteria associated with the specified release of the application, wherein the user feedback data includes at least one of issues associated with the specified release of the application or popularity associated with the specified release of the application;
ascertain a weightage for each criterion of the criteria associated with the specified release of the application; and
determine, based on the weightage for each criterion of the criteria associated with the specified release of the application, a task priority for each task of the plurality of tasks to be applied to a different release of the application by determining, for the user feedback data and for each task of the plurality of tasks, a number of occurrences of a criterion associated with the user feedback data by
performing a natural language processing analysis on the user feedback data,
identifying, based on the performing of the natural language processing analysis on the user feedback data, at least one keyword,
identifying a mapping of the at least one keyword to each task of the plurality of tasks each use-case of the at least one use-case and the feature,
for each identified mapping of the at least one keyword, increasing a weightage associated with each corresponding task of the plurality of tasks,
determining, whether a task of the plurality of tasks includes a highest weightage,
in response to a determination that no task of the plurality of tasks includes the highest weightage, identifying tasks of the plurality of tasks that include a same highest weightage, and
incrementing, for the identified tasks of the plurality of tasks that include the same highest weightage, the number of occurrences of the criterion associated with the user feedback data.

16. The non-transitory computer readable medium of claim 15, wherein the machine readable instructions to determine, based on the weightage for each criterion of the criteria associated with the specified release of the application, the task priority for each task of the plurality of tasks to be applied to the different release of the application, when executed, further cause the processor to:
for the production log data, determine, for each task of the plurality of tasks, the number of occurrences of the criterion associated with the production log data by
identifying displays associated with the specified release of the application,
identifying, for each display of the displays associated with the specified release of the application, at least one criterion of the criteria,
identifying a mapping of each display of the displays associated with the specified release of the application and the at least one criterion of the criteria to each task of the plurality of tasks,
for each identified mapping, increasing the weightage associated with each corresponding task of the plurality of tasks,
determining, whether the task of the plurality of tasks includes the highest weightage,
in response to a determination that no task of the plurality of tasks includes the highest weightage, identifying tasks of the plurality of tasks that include a same highest weightage, and
incrementing, for the identified tasks of the plurality of tasks that include the same highest weightage, the number of occurrences of the criterion associated with the production log data.

17. The non-transitory computer readable medium of claim 15, wherein the machine readable instructions to determine, based on the weightage for each criterion of the criteria associated with the specified release of the application, the task priority for each task of the plurality of tasks to be applied to the different release of the application, when executed, further cause the processor to:
determine, for each task of the plurality of tasks, the number of occurrences of each criterion of the criteria respectively associated with the at least one of the production log data or the user feedback data;
determine, for each criterion of the criteria, an averaging-based weightage value by dividing the number of occurrences of the criterion for a task by a total number of occurrences of the criterion for the plurality of the tasks; and
determine a global priority of each task by
determining, for each criterion of the criteria, a product of the weightage ascertained for a respective criterion and the averaging-based weightage value for the respective criterion, and
determining a total of each of the products for each criterion of the criteria.

18. The non-transitory computer readable medium of claim 17, wherein the machine readable instructions to determine, based on the weightage for each criterion of the criteria associated with the specified release of the application, the task priority for each task of the plurality of tasks to be applied to the different release of the application, when executed, further cause the processor to:
ascertain, for each task of the plurality of tasks, a feature priority; and
determine, for each task of the plurality of tasks, the task priority by determining a product of the global priority of a corresponding task and the feature priority of the corresponding task.

19. The non-transitory computer readable medium of claim 15, wherein the machine readable instructions to ascertain the weightage for each criterion of the criteria associated with the specified release of the application, when executed, further cause the processor to:
ascertain the weightage for each criterion of the criteria associated with the specified release of the application based on
crowd sourcing of weights associated with the specified release of the application, and
implementing a pairwise comparison of each of the criterion.

20. The non-transitory computer readable medium of claim 15, wherein
the production log data includes at least one of crashes associated with a particular display for the specified release of the application, errors associated with the particular display for the specified release of the application, or usage of the particular display for the specified release of the application.

\* \* \* \* \*